United States Patent
Kusafuka et al.

(10) Patent No.: US 11,483,544 B2
(45) Date of Patent: Oct. 25, 2022

(54) THREE-DIMENSIONAL DISPLAY SYSTEM, OPTICAL ELEMENT, INSTALLATION METHOD, CONTROL METHOD, AND MOVING BODY

(71) Applicant: KYOCERA Corporation, Kyoto (JP)

(72) Inventors: Kaoru Kusafuka, Tokyo (JP); Sunao Hashimoto, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/255,699

(22) PCT Filed: Jun. 21, 2019

(86) PCT No.: PCT/JP2019/024707
§ 371 (c)(1),
(2) Date: Dec. 23, 2020

(87) PCT Pub. No.: WO2020/004258
PCT Pub. Date: Jan. 2, 2020

(65) Prior Publication Data
US 2021/0281825 A1 Sep. 9, 2021

(30) Foreign Application Priority Data

Jun. 25, 2018 (JP) .............................. JP2018-120074

(51) Int. Cl.
*H04N 13/378* (2018.01)
*H04N 13/315* (2018.01)
*B60K 35/00* (2006.01)

(52) U.S. Cl.
CPC .......... *H04N 13/378* (2018.05); *B60K 35/00* (2013.01); *H04N 13/315* (2018.05); *B60K 2370/1531* (2019.05); *B60Y 2400/83* (2013.01)

(58) Field of Classification Search
USPC ......................................................... 348/51
See application file for complete search history.

(56) References Cited

U.S. PATENT DOCUMENTS

| 6,970,290 B1 | 11/2005 | Mashitani et al. |
| 2013/0257928 A1 | 10/2013 | Lee |

(Continued)

FOREIGN PATENT DOCUMENTS

| EP | 2 736 256 A1 | 5/2014 |
| EP | 3 554 069 A1 | 10/2019 |

(Continued)

*Primary Examiner* — Mikhail Itskovich
(74) *Attorney, Agent, or Firm* — Studebaker & Brackett PC

(57) ABSTRACT

A three-dimensional display system includes a display panel, an optical element and a controller. The display panel includes an active area configured to display a parallax image. The optical element defines a light beam direction of the parallax image. The controller is configured to vary the parallax image based on positions of first and second eyes of the user. The optical element includes a plurality of optical means which are arranged in a parallax direction. The plurality of optical means extend along an inclination direction inclined to a reference direction with respect to a direction perpendicular to the parallax direction. The reference direction is defined, at least in a standard state, based on at least one of a position of the user in the parallax direction in an interior of the moving body and a position relative to the user of a predetermined facility mounted within the moving body.

10 Claims, 21 Drawing Sheets

(56) References Cited

U.S. PATENT DOCUMENTS

| | | |
|---|---|---|
| 2014/0028812 A1 | 1/2014 | Saishu |
| 2014/0063213 A1* | 3/2014 | Tsuchihashi ......... H04N 13/376 348/59 |
| 2016/0349507 A1* | 12/2016 | Hayashi ................ G02B 27/01 |
| 2017/0171535 A1 | 6/2017 | Kim et al. |

FOREIGN PATENT DOCUMENTS

| | | |
|---|---|---|
| JP | 2001-166259 A | 6/2001 |
| JP | 2014-030259 A | 2/2014 |
| JP | 2014-045466 A | 3/2014 |
| JP | 2014-150304 A | 8/2014 |
| WO | 2014/136144 A1 | 9/2014 |
| WO | 2016047009 A1 | 3/2016 |
| WO | 2018/105533 A1 | 6/2018 |

* cited by examiner

FIG. 4

| s1 | s2 | s3 | s4 | s5 | s6 | s7 | s8 | s9 | s10 | s11 | s12 |
|---|---|---|---|---|---|---|---|---|---|---|---|
| s12 | s1 | s2 | s3 | s4 | s5 | s6 | s7 | s8 | s9 | s10 | s11 |
| s11 | s12 | s1 | s2 | s3 | s4 | s5 | s6 | s7 | s8 | s9 | s10 |
| s10 | s11 | s12 | s1 | s2 | s3 | s4 | s5 | s6 | s7 | s8 | s9 |
| s9 | s10 | s11 | s12 | s1 | s2 | s3 | s4 | s5 | s6 | s7 | s8 |
| s8 | s9 | s10 | s11 | s12 | s1 | s2 | s3 | s4 | s5 | s6 | s7 |
| s7 | s8 | s9 | s10 | s11 | s12 | s1 | s2 | s3 | s4 | s5 | s6 |
| s6 | s7 | s8 | s9 | s10 | s11 | s12 | s1 | s2 | s3 | s4 | s5 |
| s5 | s6 | s7 | s8 | s9 | s10 | s11 | s12 | s1 | s2 | s3 | s4 |
| s4 | s5 | s6 | s7 | s8 | s9 | s10 | s11 | s12 | s1 | s2 | s3 |
| s3 | s4 | s5 | s6 | s7 | s8 | s9 | s10 | s11 | s12 | s1 | s2 |
| s2 | s3 | s4 | s5 | s6 | s7 | s8 | s9 | s10 | s11 | s12 | s1 |
| s1 | s2 | s3 | s4 | s5 | s6 | s7 | s8 | s9 | s10 | s11 | s12 |
| s12 | s1 | s2 | s3 | s4 | s5 | s6 | s7 | s8 | s9 | s10 | s11 |
| s11 | s12 | s1 | s2 | s3 | s4 | s5 | s6 | s7 | s8 | s9 | s10 |
| s10 | s11 | s12 | s1 | s2 | s3 | s4 | s5 | s6 | s7 | s8 | s9 |
| s9 | s10 | s11 | s12 | s1 | s2 | s3 | s4 | s5 | s6 | s7 | s8 |
| s8 | s9 | s10 | s11 | s12 | s1 | s2 | s3 | s4 | s5 | s6 | s7 |
| s7 | s8 | s9 | s10 | s11 | s12 | s1 | s2 | s3 | s4 | s5 | s6 |

FIG. 13

|  | P1 | P2 | P3 | P4 | P5 | P6 | P7 | P8 | P9 | P10 | P11 | P12 |
|---|---|---|---|---|---|---|---|---|---|---|---|---|
| 0 | LEFT | LEFT | LEFT | LEFT | LEFT | LEFT | RIGHT | RIGHT | RIGHT | RIGHT | RIGHT | RIGHT |
| 1 | RIGHT | LEFT | LEFT | LEFT | LEFT | LEFT | LEFT | RIGHT | RIGHT | RIGHT | RIGHT | RIGHT |
| 2 | RIGHT | RIGHT | LEFT | LEFT | LEFT | LEFT | LEFT | LEFT | RIGHT | RIGHT | RIGHT | RIGHT |
| 3 | RIGHT | RIGHT | RIGHT | LEFT | LEFT | LEFT | LEFT | LEFT | LEFT | RIGHT | RIGHT | RIGHT |
| 4 | RIGHT | RIGHT | RIGHT | RIGHT | LEFT | LEFT | LEFT | LEFT | LEFT | LEFT | RIGHT | RIGHT |
| 5 | RIGHT | RIGHT | RIGHT | RIGHT | RIGHT | LEFT | LEFT | LEFT | LEFT | LEFT | LEFT | RIGHT |
| 6 | RIGHT | RIGHT | RIGHT | RIGHT | RIGHT | RIGHT | LEFT | LEFT | LEFT | LEFT | LEFT | LEFT |
| 7 | LEFT | RIGHT | LEFT | LEFT | LEFT | RIGHT | RIGHT | RIGHT | LEFT | LEFT | LEFT | LEFT |
| 8 | LEFT | LEFT | LEFT | LEFT | RIGHT | RIGHT | RIGHT | RIGHT | RIGHT | LEFT | LEFT | LEFT |
| 9 | LEFT | LEFT | LEFT | LEFT | LEFT | RIGHT | RIGHT | RIGHT | RIGHT | RIGHT | LEFT | LEFT |
| 10 | LEFT | LEFT | LEFT | LEFT | LEFT | LEFT | RIGHT | RIGHT | RIGHT | RIGHT | LEFT | LEFT |
| 11 | LEFT | LEFT | LEFT | LEFT | LEFT | LEFT | RIGHT | RIGHT | RIGHT | RIGHT | RIGHT | LEFT |

FIG. 14

| | 6 | 7 | 8 | 9 | 10 | 11 | 0 | 1 | 2 | 3 | 4 | 5 |
|---|---|---|---|---|---|---|---|---|---|---|---|---|
| 0 | | P2~P6 | P3~P6 | P4~P6 | P5~P6 | P6 | – | P1 | P1~P2 | P1~P3 | P1~P4 | P1~P5 |
| 1 | P2~P6 | | P3~P7 | P4~P7 | P5~P7 | P6~P7 | P7 | – | P2 | P2~P3 | P2~P4 | P2~P5 |
| 2 | P3~P6 | P3~P7 | | P4~P8 | P5~P8 | P6~P8 | P7~P8 | P8 | – | P3 | P3~P4 | P3~P5 |
| 3 | P4~P6 | P4~P7 | P4~P8 | | P5~P9 | P6~P9 | P7~P9 | P8~P9 | P9 | – | P4 | P4~P5 |
| 4 | P5~P6 | P5~P7 | P5~P8 | P5~P9 | | P6~P10 | P7~P10 | P8~P10 | P9~P10 | P10 | – | P5 |
| 5 | P6 | P6~P7 | P6~P8 | P6~P9 | P6~P10 | | P7~P11 | P8~P11 | P9~P11 | P10~P11 | P11 | – |
| 6 | – | P7 | P7~P8 | P7~P9 | P7~P10 | P7~P11 | | P8~P12 | P9~P12 | P10~P12 | P11~P12 | P12 |
| 7 | P1 | – | P8 | P8~P9 | P8~P10 | P8~P11 | P8~P12 | | P9~P13 | P10~P12 | P1, P11~P12 | P1, P12 |
| 8 | P1~P2 | P2 | – | P9 | P9~P10 | P9~P11 | P9~P12 | P9~P13 | | P1, P10~P12 | P1~P2, P11~P12 | P1~P2, P12 |
| 9 | P1~P3 | P2~P3 | P3 | – | P10 | P10~P11 | P10~P12 | P1, P10~P12 | P1~P2, P10~P12 | | P1~P3, P11~P12 | P1~P3, P12 |
| 10 | P1~P4 | P2~P4 | P3~P4 | P4 | – | P11 | P11~P12 | P1, P11~P12 | P1~P2, P11~P12 | P1~P3, P11~P12 | | P1~P4, P12 |
| 11 | P1~P5 | P2~P5 | P3~P5 | P4~P5 | P5 | – | P12 | P1, P12 | P1~P2, P12 | P1~P3, P12 | P1~P4, P12 | |

THREE-DIMENSIONAL DISPLAY SYSTEM, OPTICAL ELEMENT, INSTALLATION METHOD, CONTROL METHOD, AND MOVING BODY

CROSS-REFERENCE TO RELATED APPLICATION

This application claims priority to Japanese Patent Application No. 2018-120074, which was filed on Jun. 25, 2018, the contents of which are incorporated herein by reference in its entirety.

TECHNICAL FIELD

The present disclosure relates to a three-dimensional display system, an optical element, an installation method, a control method, and a moving body.

BACKGROUND

There is a heretofore known three-dimensional display device designed for three-dimensional display with no need for eyeglasses, which includes an optical element that enables a part of light emitted from a display panel to reach user's right eye, and enables other part of the light emitted from the display panel to reach user's left eye (refer to Japanese Unexamined Patent Publication JP-A 2001-166259 (Patent Literature 1)).

SUMMARY

A three-dimensional display system according to the disclosure, which is a three-dimensional display system for allowing a user of a moving body to visually recognize a three-dimensional image, includes:
a display panel including an active area configured to display a parallax image including a first image to be projected into a first eye of the user and a second image to be projected into a second eye of the user;
an optical element which defines a light beam direction of image light for the parallax image which is displayed on the active area; and
a controller configured to vary the parallax image based on a position of the first eye of the user and a position of the second eye of the user,
wherein the optical element includes a plurality of optical means which are arranged in a parallax direction, and define the light beam direction,
the plurality of optical means extend along an inclination direction inclined to a reference direction parallel to the parallax direction, with respect to a direction perpendicular to the parallax direction, and
the reference direction is defined, at least in a standard state, based on at least one of a position of the user in the parallax direction in an interior of the moving body and a position relative to the user of a predetermined facility mounted within the moving body.

A three-dimensional display system according to the disclosure, which is a three-dimensional display system for allowing a user to visually recognize a three-dimensional image, includes:
a display panel including an active area configured to display a parallax image including a first image to be projected into a first eye of the user and a second image to be projected into a second eye of the user;
an optical element which defines a light beam direction of image light for the parallax image which is displayed on the active area; and
a controller configured to vary the parallax image based on a position of the first eye of the user and a position of the second eye of the user,
wherein the optical element includes a plurality of optical means which are arranged in a parallax direction, and define the light beam direction,
the plurality of optical means extend along an inclination direction inclined to a reference direction parallel to the parallax direction, with respect to a direction perpendicular to the parallax direction,
the controller is configured to, when a face of the user is inclined to a direction opposite to the reference direction in a standard state, change the reference direction.

An optical element according to the disclosure, which is an optical element which defines a light beam direction of image light for a parallax image, includes:
a plurality of optical means which are arranged in a parallax direction, and define the light beam direction,
wherein the plurality of optical means extend along an inclination direction inclined to a first rotation direction with respect to a direction perpendicular to the parallax direction, and
a direction in which user's face rolls most frequently is predetermined as being the first rotation direction.

An installation method according to the disclosure is an installation method for installing an optical element which defines a light beam direction of image light for a parallax image, the optical element including a plurality of optical means that extend along an inclination direction inclined to a first rotation direction with respect to a direction perpendicular to a parallax direction, are arranged in the parallax direction, and define the light beam direction. The installation method includes:
determining a direction in which user's face rolls most frequently based on a position of the optical element in the parallax direction in an interior of a moving body installed with the optical element; and
determining the direction in which user's face rolls most frequently, as being the first rotation direction.

A control method according to the disclosure is a control method for controlling a three-dimensional display system for allowing a user of a moving body to visually recognize a three-dimensional image, the three-dimensional display system including a display panel including an active area configured to display a parallax image including a first image to be projected into a first eye of the user and a second image to be projected into a second eye of the user, an optical element which defines a light beam direction of image light for the parallax image which is displayed on the active area, and a controller configured to vary the parallax image, the optical element including a plurality of optical means which are arranged in the parallax direction, and define the light beam direction, the plurality of optical means extending along an inclination direction inclined to a reference direction parallel to the parallax direction, with respect to a direction perpendicular to the parallax direction, the reference direction being defined, at least in a standard state, based on at least one of a position of the user in the parallax direction in an interior of the moving body and a position relative to the user of a predetermined facility mounted within the moving body. The control method includes:
varying the parallax image based on a position of the first eye of the user and a position of the second eye of the user.

A moving body according to the disclosure includes:

a three-dimensional display system for allowing a user of a moving body to visually recognize a three-dimensional image, including a display panel including an active area configured to display a parallax image including a first image to be projected into a first eye of the user and a second image to be projected into a second eye of the user, an optical element which defines a light beam direction of image light for the parallax image which is displayed on the active area, and a controller configured to vary the parallax image based on a position of the first eye of the user and a position of the second eye of the user, the optical element including a plurality of optical means which are arranged in the parallax direction, and define the light beam direction, the plurality of optical means extending along an inclination direction inclined to a reference direction parallel to the parallax direction, with respect to a direction perpendicular to the parallax direction, the reference direction being defined, at least in a standard state, based on at least one of a position of the user in the parallax direction in an interior of the moving body and a position relative to the user of a predetermined facility mounted within the moving body.

BRIEF DESCRIPTION OF DRAWINGS

FIG. 4 is a view of a liquid crystal shutter, which is a specific example of the parallax barrier shown in FIG. 3, as viewed in the depth-wise direction;

FIG. 13 is a view showing an example of an image table indicating a correspondence between the position of the left eye, as well as the position of the right eye, and an image to be displayed via each pixel under conditions where an inter-eye distance is a standard distance;

FIG. 14 is a view showing an example of a superimposition table indicating a correspondence between the position of the left eye and the position of the right eye, and the binocularly visible region;

DETAILED DESCRIPTION

An embodiment of the disclosure will now be described with reference to drawings.

Figure 1:
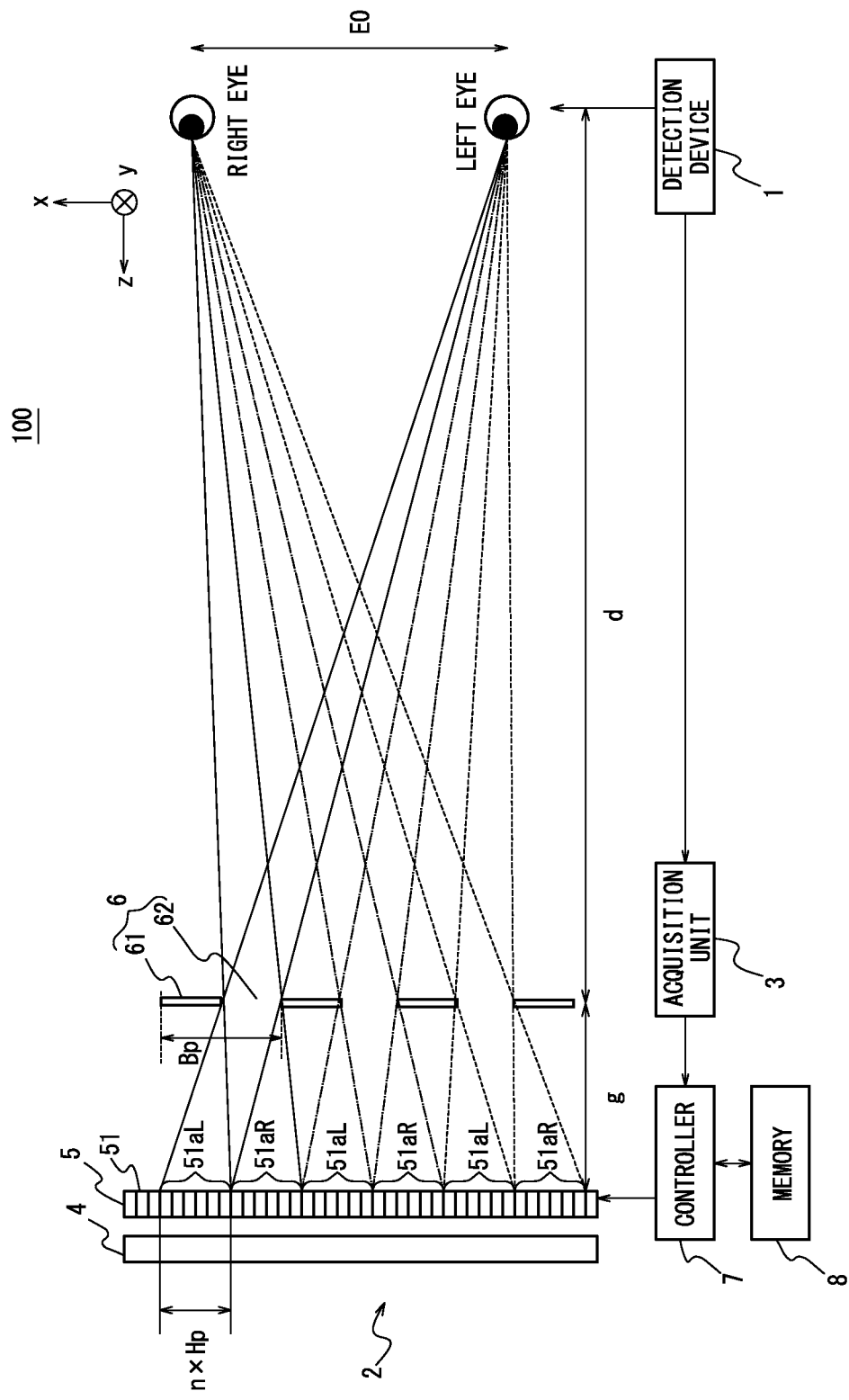
FIG. 1 is a view showing a three-dimensional display system according to an embodiment, as viewed in a vertical direction.

As shown in FIG. 1, a three-dimensional display system 100 according to an embodiment of the disclosure includes a detection device 1 and a three-dimensional display device 2.

The detection device 1 is configured to detect positions of user's eyes, namely the left eye (first eye) and the right eye (second eye), and provide output of the detected result to the three-dimensional display device 2. For example, the detection device 1 may be equipped with a camera. The detection device 1 may be configured to photograph user's face with the camera. The detection device 1 may be configured to detect the positions of the left eye and the right eye from a photographed image including an image of the face of a camera user. The detection device 1 may be configured to detect the positions of the left eye and the right eye represented in three-dimensional space coordinates from the photographed image taken by one camera. The detection device 1 may be configured to detect the positions of the left eye and the right eye represented in three-dimensional space coordinates from photographed images taken by two or more cameras.

The detection device 1 may not be provided with a camera, and may be connected to a camera provided outside the device. The detection device 1 may be provided with an input terminal for inputting a signal from the camera outside the device. The camera outside the device may be directly connected with the input terminal. The camera outside the device may be indirectly connected with the input terminal via a shared network. In the camera-free detection device 1, the camera may be provided with an input terminal for inputting a video signal. The camera-free detection device 1 may be configured to detect the positions of the left eye and the right eye in response to the video signal inputted to the input terminal.

For example, the detection device 1 may be provided with a sensor. The sensor may be constructed of an ultrasound sensor or an optical sensor, for example. The detection device 1 may be configured to detect the position of user's head with the sensor, and thereafter detect the positions of the left eye and the right eye based on the position of the head. The detection device 1 may be configured to detect the positions of the left eye and the right eye represented in three-dimensional space coordinates with one sensor, or two or more sensors.

The three-dimensional display system 100 may not include the detection device 1. In the case where the three-dimensional display system 100 is not provided with the detection device 1, the three-dimensional display device 2 may be provided with an input terminal for the input of a signal from a detection device disposed outside the device. The detection device outside the device may be connected to the input terminal. The detection device outside the device may be configured to use an electric signal and an optical signal as a transmission signal for the input terminal. The detection device outside the device may be indirectly connected with the input terminal via a shared network. The three-dimensional display device 2 may be configured to receive the input of positional coordinates indicative of the positions of the left eye and the right eye acquired by the detection device outside the device.

The three-dimensional display device 2 includes an acquisition unit 3, an irradiator 4, a display panel 5, an optical element 6, a controller (control controller) 7, and memory 8.

The acquisition unit 3 is configured to acquire the positions of the left eye and the right eye detected by the detection device 1.

The irradiator 4 is configured to planarly irradiate the display panel 5. The irradiator 4 may include a light source, a light guide plate, a diffuser plate, a diffuser sheet, etc. The irradiator 4 is configured to emit irradiation light via the light source, and achieve uniformity of the irradiation light in the planar direction of the display panel 5 via the light guide plate, the diffuser plate, the diffuser sheet, etc. Moreover, the irradiator 4 is configured to emit uniform light toward the display panel 5.

Figure 2:
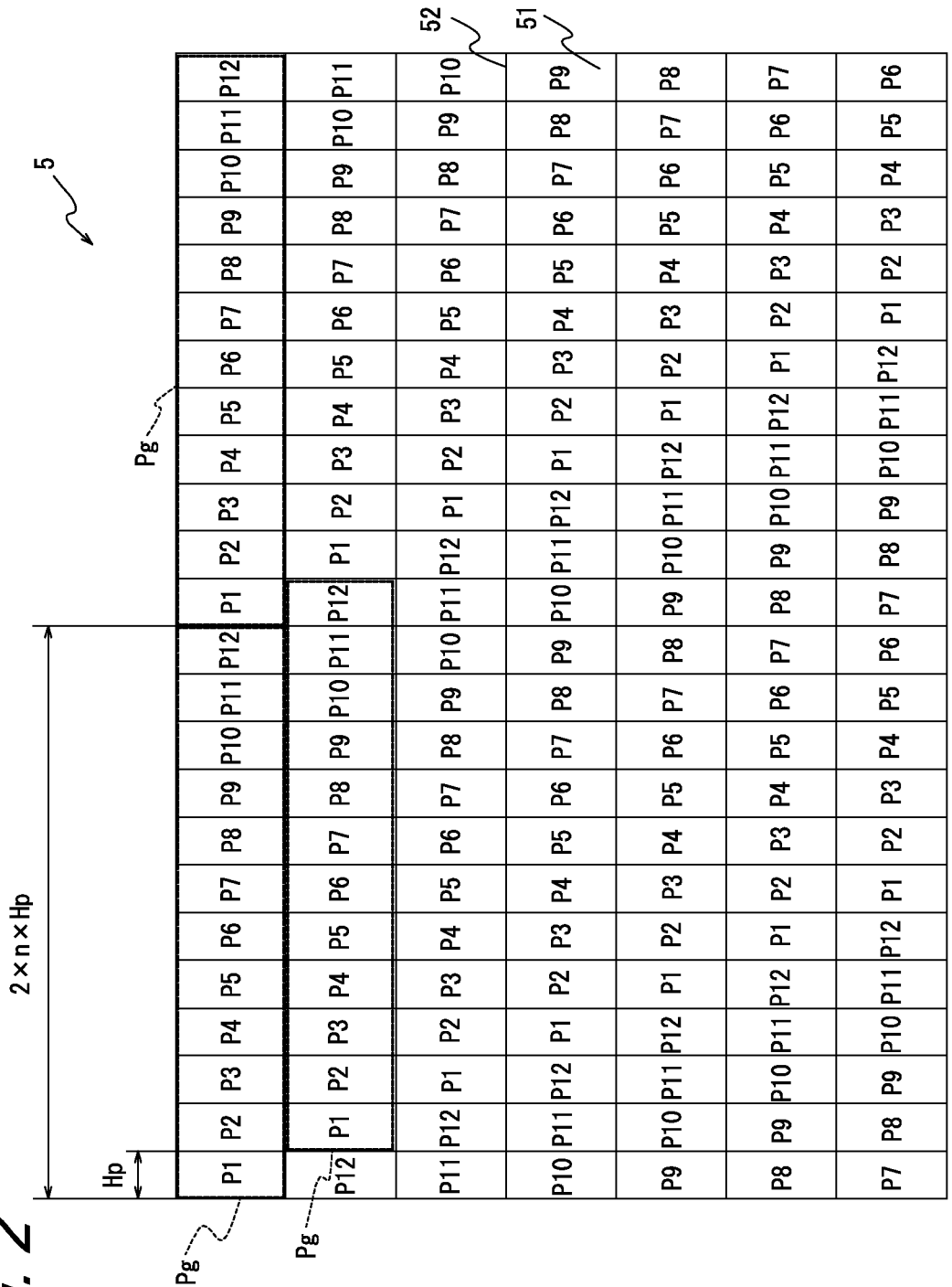
FIG. 2 is a view of a display panel shown in FIG. 1, as viewed in a depth-wise direction.

For example, a display panel such as a translucent LCD panel may be adopted for use as the display panel 5. As shown in FIG. 2, the display panel 5 includes a planar active area 51 including a plurality of segment regions thereon. The segment regions are obtained by partitioning the active area in a first direction and in a second direction perpendicular to the first direction via a black matrix 52 in grid form. A direction perpendicular to the first direction and the second direction will be called "third direction". The first direction may be called "horizontal direction". The second direction may be called "vertical direction". The third direction may be called "depth-wise direction". However, the definitions of the first direction, the second direction, and the third direction are not limited to this. In the drawings, the first direction is designated as an x-axis direction; the second direction is designated as a y-axis direction; and the third direction is designated as a z-axis direction.

Each segment region is assigned with a single subpixel. Thus, the active area 51 includes a matrix with horizontal and vertical rows of a plurality of subpixels arranged in a grid pattern.

Each subpixel is associated with corresponding one of different colors, namely R (Red), G (Green), and B (Blue). A set of three subpixels corresponding to R, G, and B, respectively, may constitute one pixel. One pixel may be called "one picture element". For example, the horizontal direction is a direction in which a plurality of subpixels constituting one pixel are aligned. For example, the vertical direction is a direction in which subpixels associated with one and the same color are aligned. The display panel 5 is not limited to a translucent LCD panel and may thus be of a display panel of other type such as an organic EL display panel. In the case where a self-luminous display panel is used for the display panel 5, the three-dimensional display device 2 may not include the irradiator 4.

The plurality of subpixels arranged in the active area 51 as described above constitute a subpixel group Pg. The subpixel group Pg is arranged repetitively in the horizontal direction. In the vertical direction, the subpixel group Pg is arranged repetitively in a manner such that vertically arranged subpixel groups are offset in the horizontal direction with respect to one another by a distance corresponding to one subpixel. The subpixel group Pg includes subpixels arranged in a predetermined matrix. More specifically, the subpixel group Pg includes (2×n×b) subpixels P1 to P(2× n×b) consecutively arranged in the form of a b (vertical) by 2×n (horizontal) subpixel matrix. In the example shown in FIG. 2, n equals 6, and b equals 1. That is, the active area 51 includes the subpixel groups Pg each including 12 subpixels P1 to P12 consecutively arranged in the form of a 1 (vertical) by 12 (horizontal) subpixel matrix. In the example shown in FIG. 2, some of the subpixel groups Pg are marked with a reference character.

The subpixel group Pg is used as a minimum unit for image display control that is carried out by the controller 7 as will hereafter be described. In this construction, the subpixels P1 to P(2×n×b) having identification information common to all the subpixel groups Pg are simultaneously and similarly controlled by the controller 7. For example, for switching of an image to be displayed via the subpixel P1 from an image for the left eye, being called "left eye image" to an image for the right eye, being called "right eye image", the controller 7 effects concurrent switching of all images that are each displayed via the subpixel P1 of the corresponding subpixel group Pg from left eye images to right eye images.

As shown in FIG. 1, the optical element 6 is defined by a plane along the active area 51, and is spaced by a predetermined distance (gap) g away from the active area 51. The optical element 6 may be located on a side of the display panel 5 which is opposite to the irradiator 4. The optical element 6 may be located on a side of the display panel 5 which is close to the irradiator 4.

For example, the optical element 6 is a parallax barrier. The optical element 6 includes a plurality of optical means which are arranged repetitively in an alternate order in the first direction which may be defined as a parallax direction. The plurality of optical means extend along a predetermined inclination direction. The predetermined inclination direction refers to a direction inclined to a reference direction with respect to a direction perpendicular to the parallax direction within the plane of the optical element 6, in other words, a direction inclined to a first rotation direction with respect to a direction perpendicular to the parallax direction.

The reference direction refers to a direction parallel to the parallax direction, and more specifically, a direction toward one of the ends of a line segment paralleling the parallax direction. As will hereafter be described, for example, the reference direction in a standard state is defined according to design specifications, and the reference direction may be changed according to user's condition. The explanation of the first rotation direction will be given later. The standard state refers to a state determined so as to ensure a maximum level of perception of three-dimensional forms with consideration given to an ideal condition of a user sitting in a moving body.

For example, the optical means of the optical element 6 is a light transmitting region 62 in the form of a strip-shaped region, or a dimming face 61 which defines the light transmitting region 62 as will hereafter be described. The optical means defines a light beam direction which is a propagation direction of image light for a parallax image as will hereafter be described. Thus, the optical element 6 defines the light beam direction which is the propagation direction of image light emitted from the subpixels, on a strip-shaped light transmitting region 62-by-strip-shaped light transmitting region 62 basis.

As shown in FIG. 1, the optical element 6 defines image light emitted from the subpixels arranged in the active area 51, thereby permitting delimitation of regions on the active area 51 which are visually recognized by user's eyes. In what follows, a region within the active area 51 which emits image light that travels to the position of user's eyes will be called "visible region 51a". That is, a region within the active area 51 which emits image light that travels to the position of user's left eye will be called "left eye visible region 51aL" (first visible region), and a region within the active area 51 which emits image light that travels to the position of user's right eye will be called "right eye visible region 51aR" (second visible region).

Figure 3:
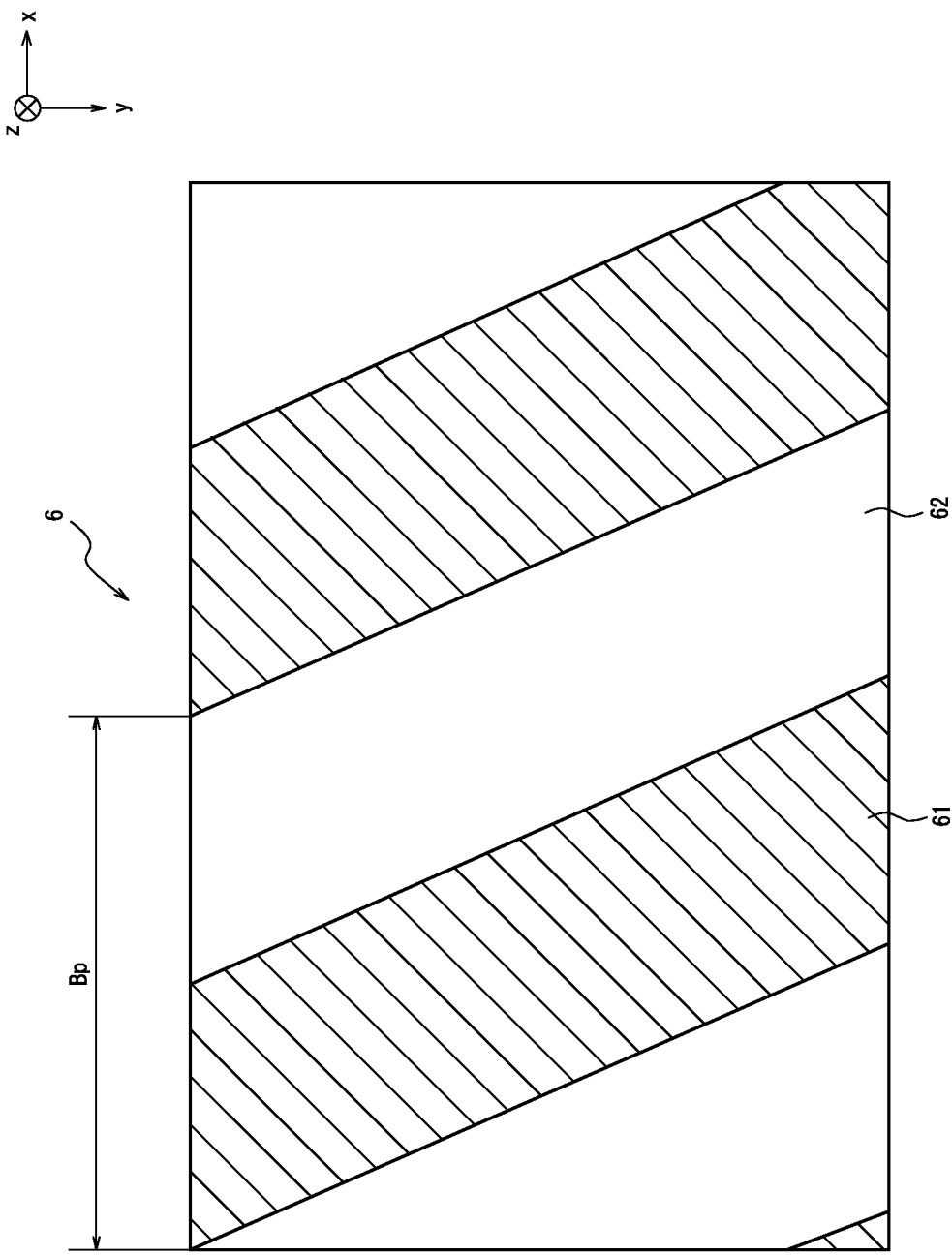
FIG. 3 is a view of a parallax barrier shown in FIG. 1, as viewed in the depth-wise direction.

More specifically, as shown in FIG. 3, the optical element 6 includes a plurality of dimming faces 61 for dimming image light. A plurality of dimming faces 61 delimit the light transmitting regions 62, each located between the dimming faces 61 arranged adjacent each other. The light transmitting region 62 is higher in light transmittance than the dimming face 61, expressed differently, the dimming face 61 is lower in light transmittance than the light transmitting region 62.

The light transmitting region 62 is a portion which transmits light entering the optical element 6. The light transmitting region 62 may enable light to pass therethrough at a transmittance which is greater than or equal to a first predetermined value. For example, the first predetermined value is set at a value of approximately 100%, or a value below 100%. The first predetermined value need only be a value that ensures satisfactory visual recognition of image light emitted from the active area 51, and may thus be set at a value which is less than or equal to 100%, for example, 80% or 50%. A dimming region defined by the dimming face 61 is a portion which blocks light entering the optical element 6 and hardly transmits the light. In other words, the dimming region prevents user's eyes from having access to an image displayed on the active area 51 of the display panel 5. The dimming region may block light at a transmittance which is less than or equal to a second predetermined value. For example, the second predetermined value is set at a value of approximately 0%, or a value above or close to 0%, for example, 0.5%, 1%, or 3%. The first predetermined value may be several times as great as the second predetermined value, and more specifically may be more than ten times the second predetermined value, for example.

As shown in FIG. 1, a barrier pitch Bp, which is the pitch of horizontal arrangement of the light transmitting regions 62, and a gap g between the active area 51 and the optical element 6 are determined so that the following expressions (1) and (2) using an optimal viewing distance d and a standard distance E0 hold.

$$E0: d = (n \times Hp): g \quad (1)$$

$$d: Bp = (d+g):(2 \times n \times Hp) \quad (2)$$

The optimal viewing distance d refers to a distance between each of user's right eye and left eye and the optical element 6 at a level such that the horizontal length of the visible region 51a equates to the size of n subpixels. A direction of a straight line passing through the right eye and the left eye (the eye arrangement direction) coincides with the horizontal direction. The standard distance E0 refers to an average inter-eye distance E of users. For example, the standard distance E0 may be set at values ranging from 61.1 mm to 64.4 mm obtained by calculation in the study by National Institute of Advanced Industrial Science and Technology. Hp represents the horizontal length of the subpixel as shown in FIG. 2.

In this embodiment, the optical element 6 is a liquid crystal shutter. For example, as shown in FIG. 4, the liquid crystal shutter may include a matrix with horizontal and vertical rows of a plurality of shutter regions s arranged in grid form as shown in FIG. 4. The liquid crystal shutter is configured to be able to control light transmittance according to an applied voltage. The liquid crystal shutter, which includes a plurality of pixels serving as the shutter regions s, may be configured to control light transmittance in each pixel. In the liquid crystal shutter, a region of high light transmittance or a region of low light transmittance may be formed in any given configuration. Thus, in the case where the optical element 6 is formed of a liquid crystal shutter, the light transmitting region 62 and the dimming region 61 are variable. In the case where the optical element 6 is formed of a liquid crystal shutter, the light transmitting region 62 may be made as a region having a transmittance which is greater than or equal to the first predetermined value. Moreover, in the case where the optical element 6 is constructed of a liquid crystal shutter, the dimming face 61 may be made as a region having a transmittance which is less than or equal to the second predetermined value.

For example, as described above, in the construction in which the liquid crystal shutter includes a plurality of shutter regions s arranged in grid form, some of a plurality of shutter regions s provided in a shutter panel 7 constitute a shutter region group sg. The shutter region group sg includes a predetermined number of shutter regions s arranged in horizontal rows, as well as in vertical rows. More specifically, in conformity with the arrangement of subpixels constituting the subpixel group Pg, the shutter region group sg includes (2×n×b) shutter regions s1 to s(2×n×b) consecutively arranged in the form of a b (vertical) by 2×n (horizontal) shutter region matrix. The shutter region group sg is arranged repetitively in the horizontal direction. In the vertical direction, the shutter region group sg is arranged repetitively in a manner such that vertically arranged adjacent shutter region groups are offset in the horizontal direction with respect to one another by a distance corresponding to one shutter region. Such an arrangement may define the light transmitting regions 62 and the dimming regions 61 extending in the predetermined inclination direction.

The optical element 6 may be formed of a film or a sheet member having a transmittance which is less than the second predetermined value. In this case, the dimming face 61 is constituted by the film or the sheet member. The light transmitting region 62 is constituted by an opening formed in the film or the sheet member. The film may be formed of resin or other material. The sheet member may be formed of resin, or metal, or also other material. The optical element 6 is not limited to the film and the sheet member, and may thus be formed of other member of different type. The optical element 6 may include a base material which exhibits dimming properties on its own, or a base material containing an adjunct having dimming properties.

Thus constructed, the optical element 6 enables image light emitted from some subpixels in the active area 51 to pass through the light transmitting region 62 and travel to user's right eye. Moreover, the optical element 6 enables image light emitted from some other subpixels to pass through the light transmitting region 62 and travel to user's left eye. Propagation of image light to each of user's left and right eyes allows an image visually recognized by user's eyes to be provided. This will now be described in detail with reference to FIGS. 5 and 6.

Figure 5:
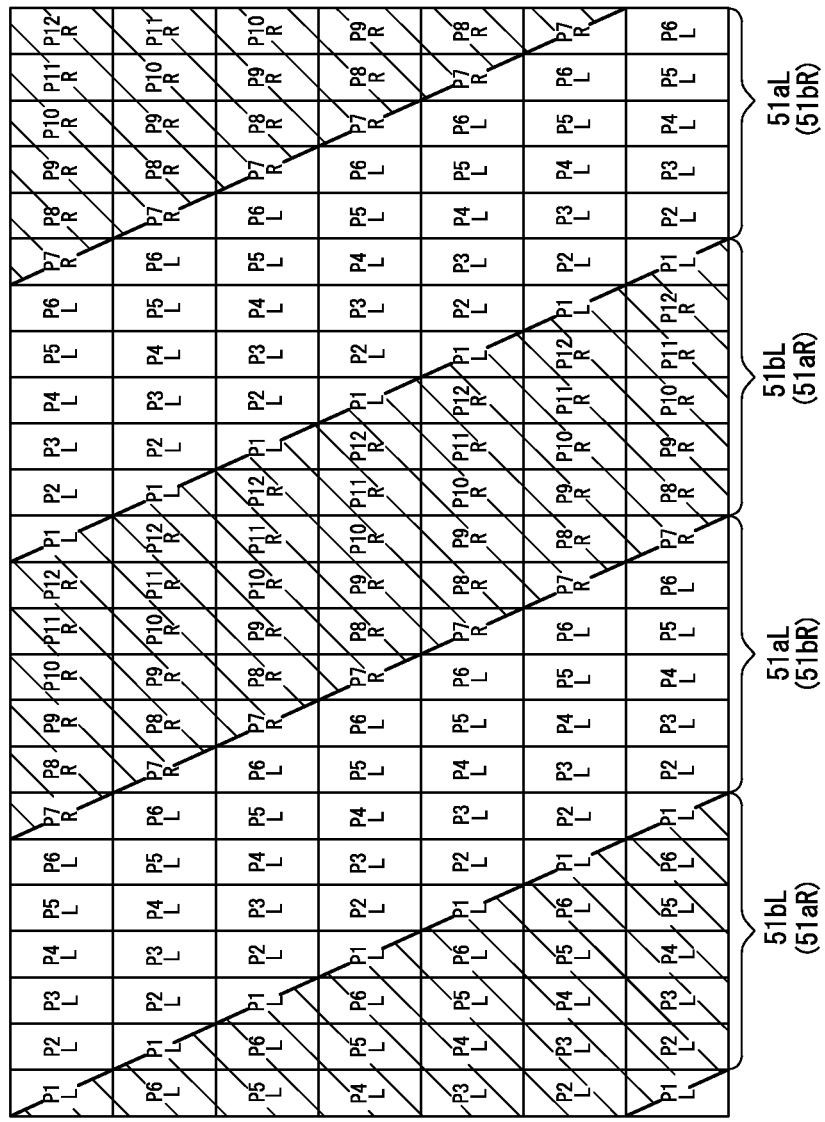
FIG. 5 is an explanatory view for illustrating a left eye visible region on the display panel shown in FIG. 1.

As described above, the left eye visible region 51aL shown in FIG. 5 is a part on the active area 51 which is visually recognized by user's left eye upon arrival of image light which has passed through the light transmitting region 62 of the optical element 6 at user's left eye. On the other hand, a left eye non-visible region 51bL is a region which cannot be visually recognized by user's left eye due to image light being blocked by the dimming face 61 of the optical element 6. The left eye visible region 51aL includes one-half of the subpixel P1, the whole of the subpixels P2 to P6, and one-half of the subpixel P7.

Figure 6:
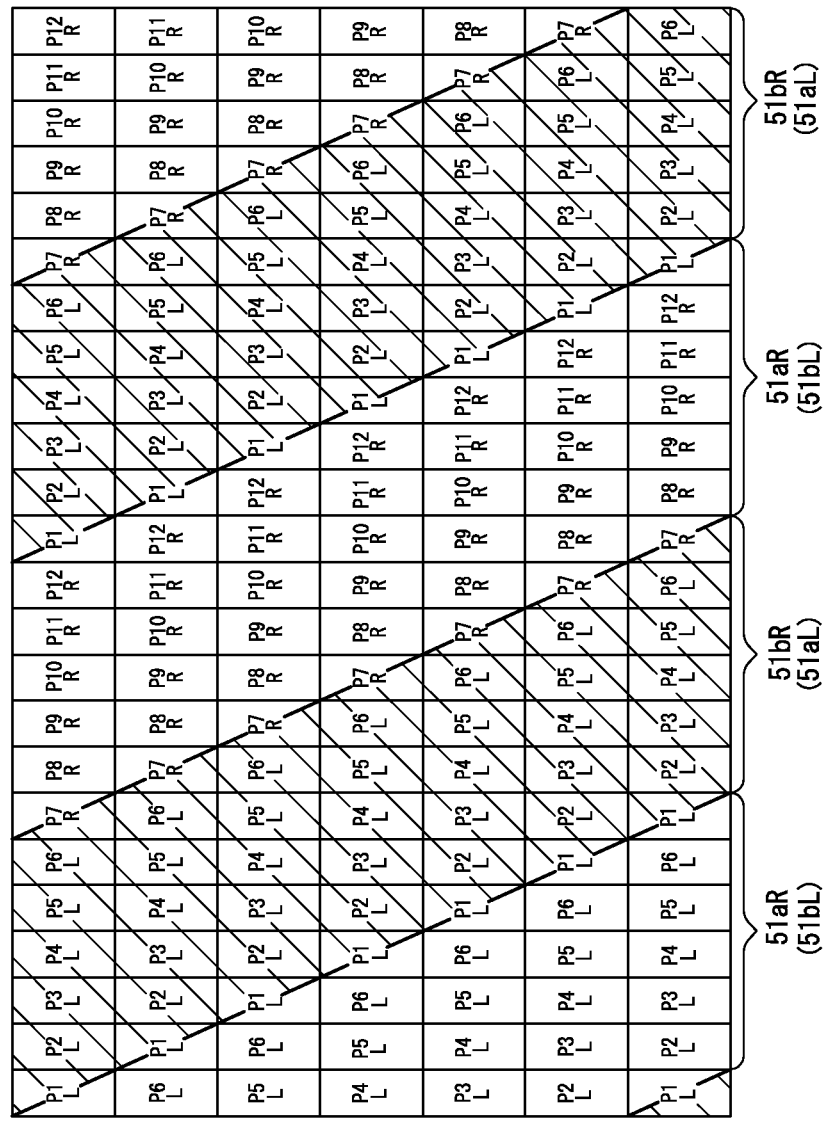
FIG. 6 is an explanatory view for illustrating a right eye visible region on the display panel shown in FIG. 1.

The right eye visible region 51aR shown in FIG. 6 is a part on the active area 51 which is visually recognized by user's right eye upon arrival of image light from some other subpixels which has passed through the light transmitting region 62 of the optical element 6 at user's right eye. On the other hand, a right eye non-visible region 51bR is a region which cannot be visually recognized by user's right eye due to image light being blocked by the dimming face 61 of the optical element 6. The right eye visible region 51aR includes one-half of the subpixel P7, the whole of the subpixels P8 to P12, and one-half of the subpixel P1.

When a left eye image (first image) s displayed via the subpixels P1 to P6 and a right eye image (second image) is displayed via the subpixels P7 to P12, the left eye and the right eye visually recognize the corresponding images. More specifically, the left eye visually recognizes the left eye image by being provided with one-half of the left eye image displayed via the subpixel P1, the whole of the left eye image displayed via the subpixels P2 to P6, and one-half of the right eye image displayed via the subpixel P7. Moreover, the right eye visually recognizes the right eye image by being provided with one-half of the right eye image displayed via the subpixel P7, and the whole of the right eye image displayed via the subpixels P8 to P12, and one-half of the left eye image displayed via the subpixel P1. In FIGS. 5 and 6, the subpixels for left eye image display are each marked with a reference character "L", and the subpixels for right eye image display are each marked with a reference character "R".

In this condition, the area of the left eye image visible to user's left eye is maximized, whereas the area of the right eye image which is visually recognized by the left eye is minimized. Moreover, the area of the right eye image which is visually recognized by user's right eye is maximized, whereas the area of the left eye image which is visually recognized by the right eye is minimized. This allows the user to visually recognize a three-dimensional image with minimum crosstalk.

In the three-dimensional display device 2 thereby constructed, when the left eye image and the right eye image, which exhibit parallax with respect to each other, are displayed via the subpixel included in the left eye visible region 51aL and the subpixel included in the right eye visible region 51aR, respectively, a user whose inter-eye distance E is the standard distance E0 is able to visually recognize a three-dimensional image properly. In the above-described construction, the left eye image is displayed via a subpixel of which half or more is visually recognized by the left eye, and the right eye image is displayed via a subpixel of which half or more is visually recognized by the right eye. However, this does not constitute structural limitation. Depending on the design specifications of the active area 51, the optical element 6, etc., determination of subpixels for display of the left eye image and those for display of the right eye image may be made freely yet suitably on the basis of the left eye visible region 51aL and the right eye visible region 51aR in the interest of minimization of crosstalk. For example, in this construction, according to the opening ratio of the optical element 6, etc., the left eye image may be displayed via a subpixel which is visually recognized by the left eye at a predetermined rate or more, and the right eye image may be displayed via a subpixel which is visually recognized by the right eye at a predetermined rate or more.

The controller 7 is configured to make connection with each of the components constituting the three-dimensional display system 100 for control of the constituent components. The constituent components that are controlled by the controller 7 include the detection device 1 and the display panel 5. In the construction using the optical element 6 designed so that the inclination direction of the light transmitting region and the dimming region can be changed, the constituent components that are controlled by the controller 7 may also include the optical element 6.

For example, the controller 7 is built as a processor. The controller 7 may include one or more processors. The processor may include a general-purpose processor for performing a specific function by loading of a specific program, and a special-purpose processor designed specifically for a specific processing operation. The special-purpose processor may include an ASIC (Application-Specific Integrated Circuit). The processor may include a PLD (Programmable Logic Device). The PLD may include a FPGA (Field-Programmable Gate Array). The controller 7 may be based on any one of SoC (System-on-a-Chip) using a single processor or a plurality of processors that operate in cooperation, and SiP (System In a Package). The controller 7 may include a memory unit, and store various information, or programs for operation of the constituent components of the three-dimensional display system 100, etc in the memory unit. For example, the memory unit may be constructed of a semiconductor memory. The memory unit may be configured to serve as working memory for the controller 7.

The controller 7 may be configured to determine a direction in which user's face is inclined to the vertical direction on the basis of the positions of user's left eye and right eye identified via the acquisition unit 3. The controller 7 may be configured to, when user's face is inclined to a direction opposite to the reference direction in the standard state, change the reference direction, and more specifically, reverse the reference direction.

The controller 7 may be configured to, when the inclination direction is the reference direction in the standard state, or, under conditions where the inclination direction is opposite to the reference direction, and, after the reversal of the reference direction, user's face is further inclined to the reversed reference direction, vary the parallax image based on the positions of user's left eye and right eye, as will hereafter be described.

For example, the memory 8 is constructed of a given memory device such as RAM (Random Access Memory) and ROM (Read Only Memory). The memory 8 is configured to store one or more of a first table, a second table, and a third table that will hereafter be described in detail.

Moreover, the memory 8 is configured to store one or more of a fourth table, a fifth table, and a sixth table that will hereafter be described in detail.

Figure 7:
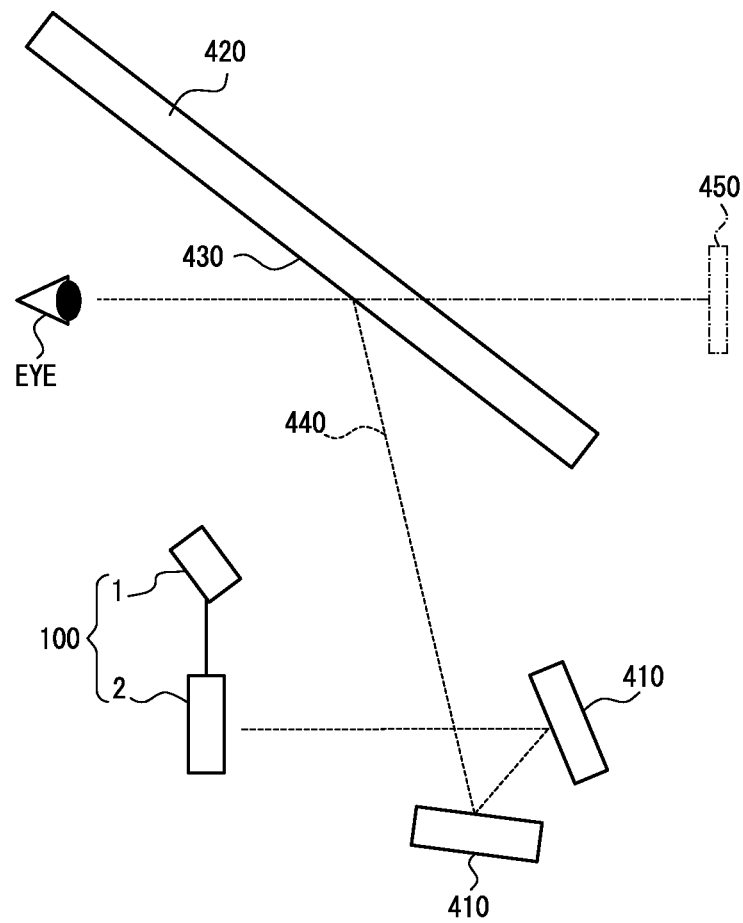
FIG. 7 is a view showing an example of HUD incorporating the three-dimensional display system according to the embodiment.

As shown in FIG. 7, the three-dimensional display system 100 may be installed in a head-up display system 400. The head-up display system 400 is also referred to as "HUD (Head Up Display) 400". The HUD 400 includes the three-dimensional display system 100, an optical member 410, and a member for projection 420 including a plane of projection 430. The HUD 400 is configured to enable image light emitted from the three-dimensional display system 100 to travel via the optical member 410 to the member for projection 420. The HUD 400 is configured to enable the image light reflected from the member for projection 420 to reach the left and right eyes of a user. That is, the HUD 400 is configured to enable image light from the three-dimensional display system 100 to travel along an optical path 440 indicated by dashed lines so as to reach user's left and right eyes. This allows the user to visually recognize a virtual image 450 resulting from the image light which has arrived at user's eyes through the optical path 440.

Figure 8:
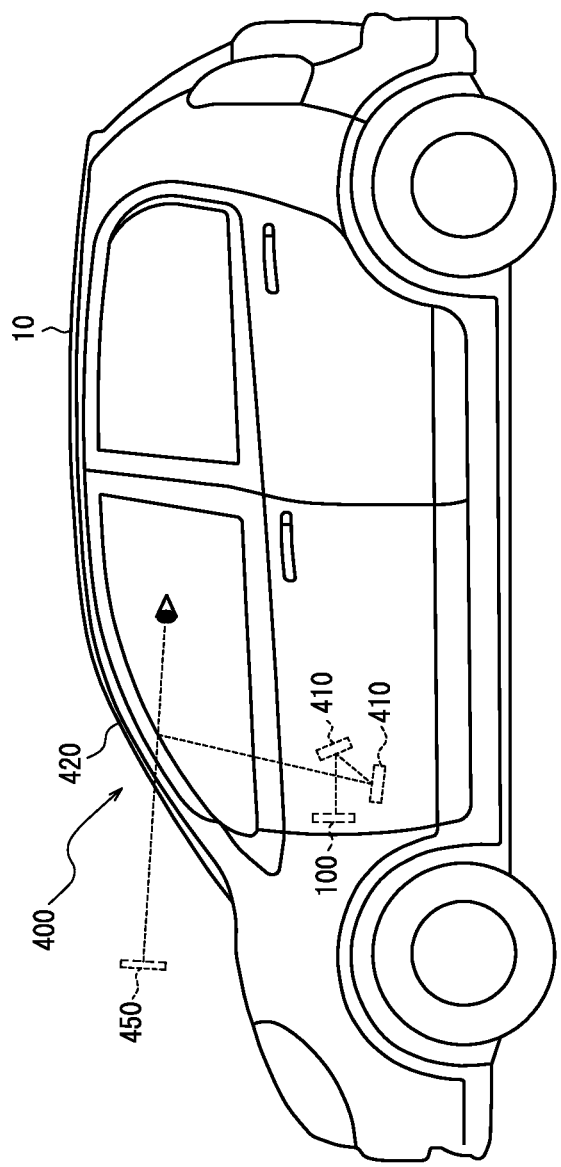
FIG. 8 is a view showing an example of a moving body installed with the HUD shown in FIG. 7.

As shown in FIG. 8, the three-dimensional display system 200, which may be incorporated in the HUD 400, is installed in a moving body 10. Some constituent components of the HUD 400 may be prepared by the shared use of some devices or components of the moving body 10. For example, in the moving body 10, its windshield may serve also as the member for projection 420. In the case where some HUD constituent components are prepared by the shared use of some devices or components of the moving body 10, other HUD constituent components may be called "HUD modules" or "three-dimensional display components". The HUD 400 and the three-dimensional display system 200 may be installed in the moving body 10. The "moving body" in the disclosure includes vehicles, ships, and aircraft. The "vehicle" in the disclosure includes motor vehicles and industrial vehicles, but is not limited to them, and may also include railroad vehicles, domestic vehicles, and fixed-wing airplanes that run on runways. The "motor vehicle" includes passenger automobiles, trucks, buses, motorcycles, and trolleybuses, but is not limited to them, and may also include other types of vehicles that run on roads. The "industrial vehicle" includes industrial vehicles for agriculture and industrial vehicles for construction work. The "industrial vehicle" includes forklifts and golf carts, but is not limited to them. The "industrial vehicle for agriculture" includes tractors, cultivators, transplanters, binders, combines, and lawn mowers, but is not limited to them. The "industrial vehicle for construction work" includes bulldozers, scrapers, loading shovels, crane vehicles, dump trucks, and road rollers, but is not limited to them. The "vehicle" also includes human-powered vehicles. Categorization criteria for vehicles are not limited to the foregoing. For example, the "motor vehicle" may include industrial vehicles that can run on roads, and, one and the same vehicle may be put in a plurality of categories. The "ship" in the disclosure includes personal watercraft, boats, and tankers. The "aircraft" in the disclosure includes fixed-wing airplanes and rotary-wing airplanes.

The following describes the inclination direction of the optical means in the interior of the moving body 10. A direction in which user's face rolls most frequently in the interior of the moving body 10 is predefined as the above-described first rotation direction, in other words, the reference direction in the standard state. As will hereafter be described, the frequency of occurrence of the rolling movement of user's face in the interior of the moving body 10 tends to depend on the position of the user of the three-dimensional display system 200 in the interior of the moving body 10. Thus, the first rotation direction, as well as the reference direction in the standard state, is determined on the basis of the position of the user in the parallax direction in the interior of the moving body 10.

The first rotation direction and the reference direction are directions which are defined for an image to be visually recognized by the user. Thus, as shown in FIGS. 7 and 8, in the configuration in which an image to be visually recognized by the user is derived by causing an image displayed on the three-dimensional display device 2 to undergo reflection over odd number of times, directions opposite to the first rotation direction and the reference direction defined for an image to be visually recognized by the user is the first rotation direction, as well as the reference direction, in the display panel 5.

In most cases, in the interior of the moving body 10, an armrest, a shift knob, a drink holder, etc. are located in the vicinity of the center in the parallax direction of the three-dimensional display system 200 installed in the moving body 10. Thus, user's face presumably rolls most frequently toward an opposite side to a position of a user with respect to the center of the interior of the moving body 10 along the parallax direction. Moreover, in the configuration in which a user in the interior of the moving body 10 is positioned at an end part of the interior of the moving body 10 along the parallax direction, some users are likely to feel cramped in the vicinity of the pillar, the door, the window, etc. of the moving body 10. Thus, the user's face presumably rolls most frequently toward the center of the interior of the moving body 10 in the parallax direction.

Figure 9:
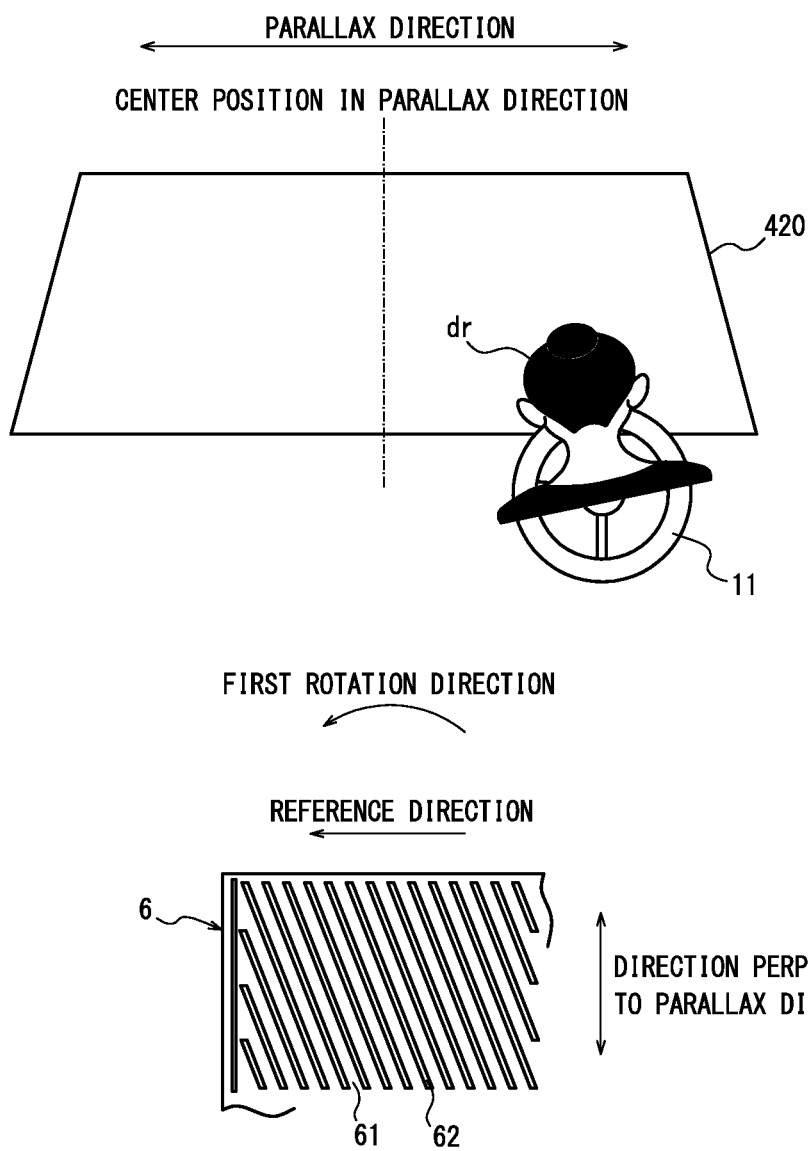
FIG. 9 is an explanatory view for illustrating a method for determination of a first rotation direction and a reference direction on the basis of at least one of user's position in the interior of the moving body and a position of a predetermined facility mounted within the moving body.

Thus, as shown in FIG. 9, in the configuration in which a position of the user dr is on the right side with respect to the center of the interior of the moving body 10 in the parallax direction, the user dr presumably rolls most frequently in a counterclockwise direction. Thus, in such a configuration, the counterclockwise direction may be defined as the first rotation direction, and a direction opposite to a direction from the center of the interior of the moving body 10 toward the position of the user dr in the parallax direction, i.e. leftward direction, may be defined as the reference direction in the standard state. Thus, as described above, the optical element 6 is disposed in the moving body 10 so that the optical means extends while being inclined to the counterclockwise direction, or leftward direction with respect to a direction perpendicular to the parallax direction in an image to be visually recognized by the user dr.

Moreover, the first rotation direction and the reference direction in the standard state may be determined on the basis of the position relative to the user dr of a predetermined facility mounted within the moving body 10 in the parallax direction. This is because the predetermined facility may serve to define the position of the user dr in the interior of the moving body 10. For example, the position of the three-dimensional display system 200 user dr in the parallax direction in the interior of the moving body 10 is determined on the basis of the positions of installation of the facilities for operation of the moving body 10, such as the steering wheel, the gas pedal, and the brake pedal. Thus, as shown in FIG. 9, in the configuration in which a steering wheel 11 is located on the right side with respect to the center of the interior of the moving body 10 in the parallax direction, the user dr presumably rolls most frequently in the counterclockwise direction. Thus, in such a configuration, the counterclockwise direction may be defined as the first rotation direction, and a direction opposite to the direction from the center of the interior of the moving body 10 in the parallax direction toward the position of the steering wheel 11, i.e. leftward direction, may be defined as the reference direction in the standard state.

As described above, in the method of installation of the optical element 6 according to the present embodiment, first, a step of estimating a direction in which the face of the user dr rolls most frequently in the moving body 10 which is installed with the optical element 6 is carried out. Subsequent to the step of estimating the direction in which the rolling movement occurs with high frequency, a step of defining the direction as the first rotation direction is carried out. Subsequent to the step of determining the first rotation direction, the optical element 6 is installed in the moving body 10 so that the optical means extends in the inclination direction rotationally inclined to the first rotation direction with respect to the vertical direction.

<<<as to Varying a Parallax Image by Controller 7>>>

<<In the Case where an Inter-Eye Distance is not a Standard Distance>>

Figure 10:
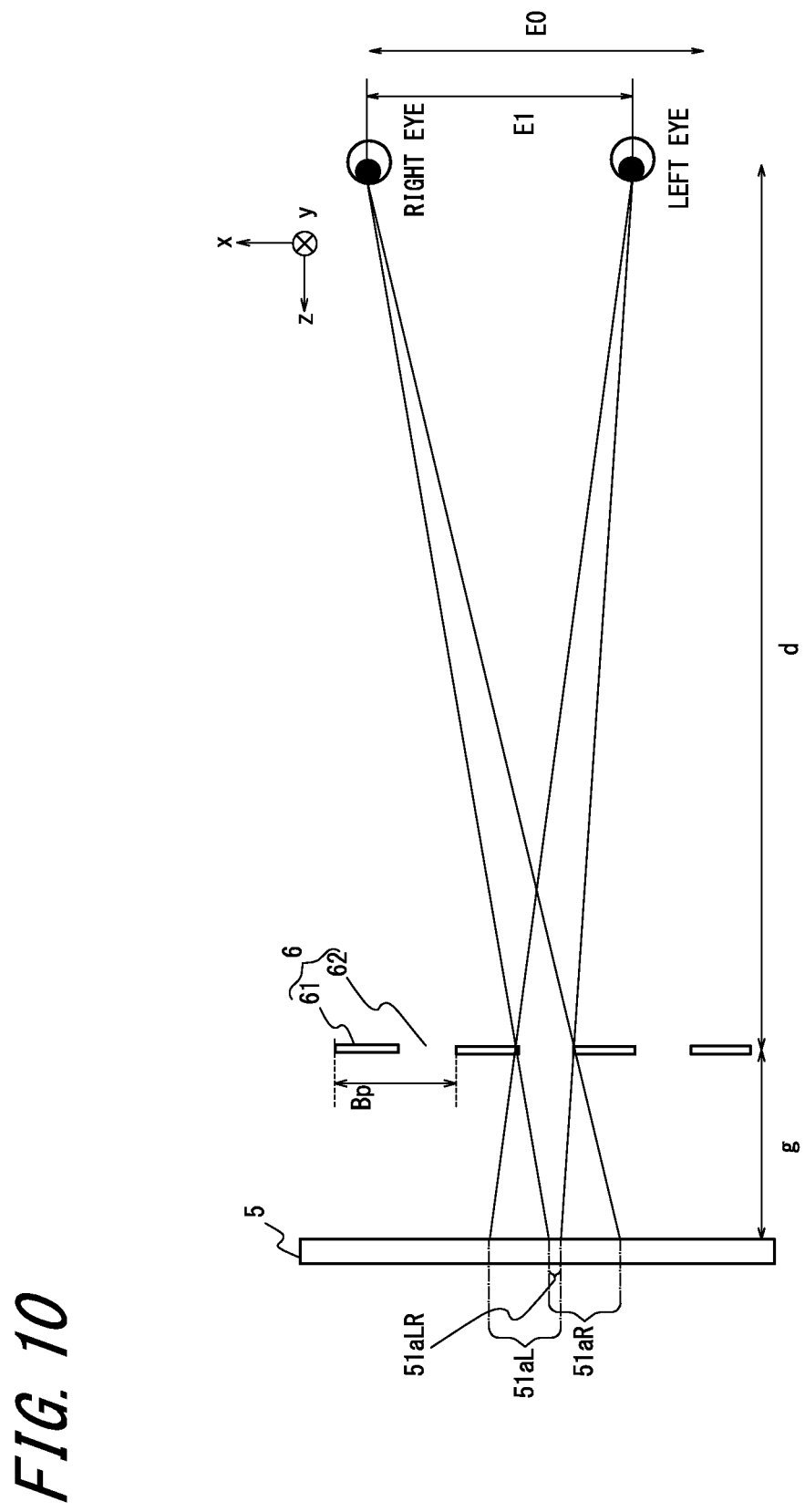
FIG. 10 is an explanatory view for illustrating a binocularly visible region in the three-dimensional display system shown in FIG. 1.

In the case where an inter-eye distance E of the user dr is defined as an inter-eye distance E1 which differs from the standard distance E0, as shown in FIG. 10, there may exist a binocularly visible region 51aLR where part of the left eye visible region 51aL and part of the right eye visible region 51aR are overlapped. Consequently, there may exist a subpixel which is a left subpixel (first subpixel) determined to be intended to display the left eye image on the basis of the left eye visible region 51aL and also is a right subpixel (second subpixel) determined to be intended to display the right eye image on the basis of the right eye visible region 51aR. In this case, when the right eye image is displayed via the subpixel which is the left subpixel and also is the right subpixel, the area of the right eye image which is visually recognized by the left eye is increased. Moreover, when the left eye image is displayed via the subpixel which is the left subpixel and also is the right subpixel, the area of the left eye image which is visually recognized by the right eye is increased. Consequently, even if any of the left eye image and display of the right eye image is displayed on the overlapping subpixels, crosstalk may increase. In this regard, the controller 7 is configured to carry out control so as to reduce crosstalk generated when the user dr having the inter-eye distance E1 visually recognizes the three-dimensional display device 2 designed according to the standard distance E0. The following details the controller 7.

<Determination of Third Subpixel>

The controller 7 is configured to determine a third subpixel on the basis of the positions of the eyes of the user dr in the horizontal direction. The third subpixel is a left subpixel determined to be intended to display the left eye image on the basis of the left eye visible region 51aL, and also is a right subpixel determined to be intended to display the right eye image on the basis of the right eye visible region 51aR. The following describes examples of third-subpixel determination procedure.

First Example

The controller 7 may be configured to, on detection of the position of the left eye by the detection device 1, determine the left eye visible region 51aL through computation on the position of the left eye, the gap g, the optimal viewing distance d, and the position of the light transmitting region 62.

Figure 11:
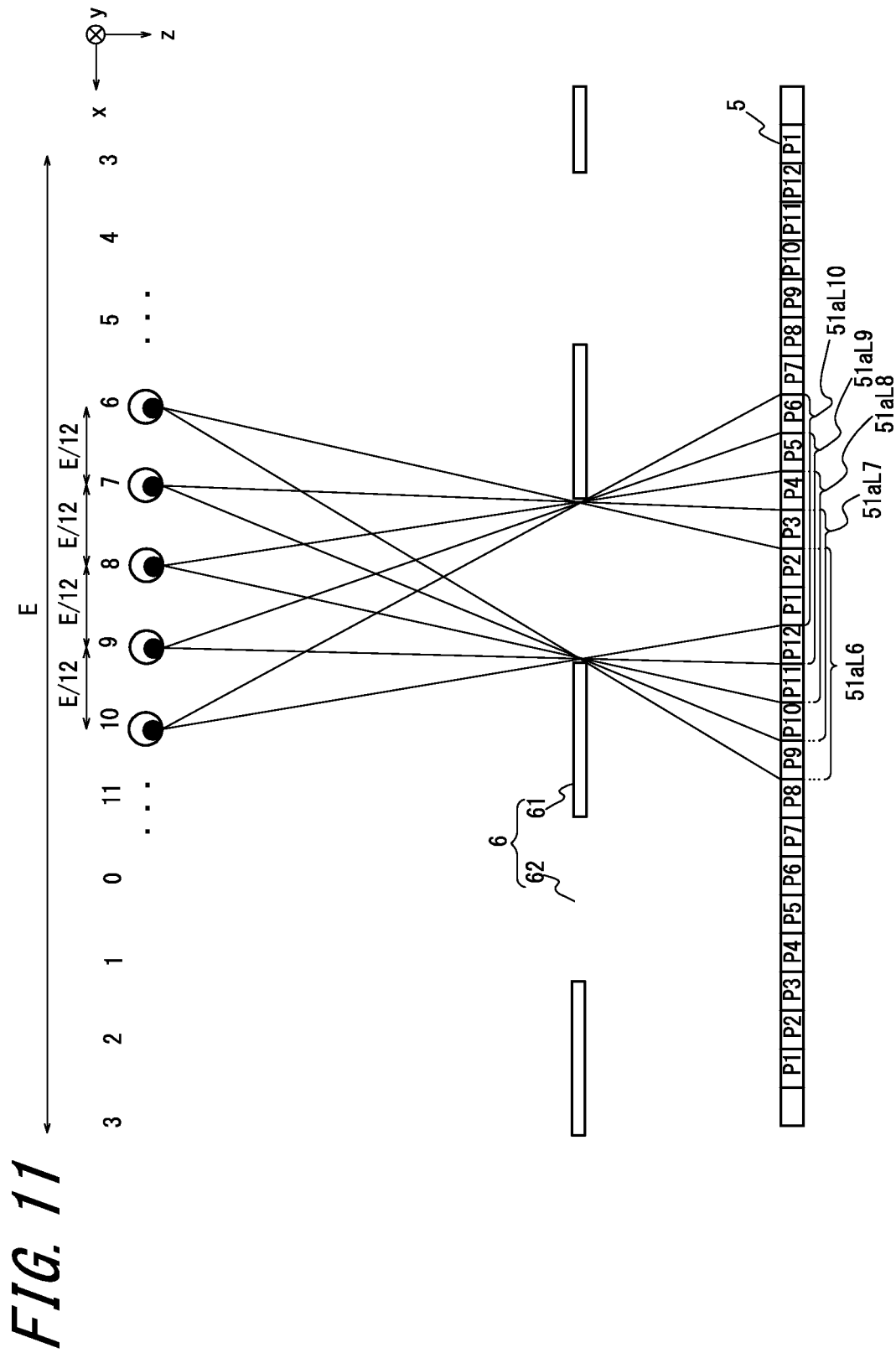
FIG. 11 is an explanatory view for illustrating details of the left eye visible region on the display panel in accordance with the position of the left eye.

For example, as shown in FIG. 11, the controller 7 is configured to, when the left eye lies at a position "6", determine that the left eye visible region 51aL is a left eye visible region 51aL6 through computation on the gap g, the optimal viewing distance d, and the position of the light transmitting region 62. The controller 7 is configured to determine the left subpixel intended to display the left eye image on the basis of the left eye visible region 51aL6. For example, the controller 7 may be configured to determine that the subpixels P9 to P12, P1, and P2, each of which is a subpixel which is included at a predetermined rate (half, for example) or more in the left eye visible region 51aL, are the left subpixels. The controller 7 may be configured to determine the left subpixel on the basis of the left eye visible region 51aL in a given manner permitting maximization of the area of the left eye image which is visually recognized by the left eye.

The controller 7 is configured to, when the left eye lies at a position "7", determine that the left eye visible region 51aL is a left eye visible region 51aL7 through computation on the gap g, the optimal viewing distance d, and the position of the light transmitting region 62. The controller 7 is configured to determine the left subpixel intended to display the left eye image on the basis of the left eye visible region 51aL7. For example, the controller 7 may be configured to determine that the subpixels P10 to P12 and P1 to P3, each of which is a subpixel which is included at a predetermined rate or more in the left eye visible region 51aL, are the left subpixels.

As described above, the barrier pitch Bp, the gap g, and the optimal viewing distance d are preset so that the left eye visible region 51aL and the right eye visible region 51aR are not overlapped in the case where the inter-eye distance E is the standard distance E0. According to the related art, for example, the controller 7 is configured to acquire only the position of the left eye, and determine the left eye visible region 51aL based on the position of the left eye, and also determine that a region other than the left eye visible region 51aL is the right eye visible region 51aR. On the other hand, in this embodiment, the controller 7 is configured to determine the right eye visible region 51aR through computation on the position of the right eye of the user dr detected by the detection device 1, the position of the barrier opening area, the gap g, and the optimal viewing distance d. The controller 7 may be configured to determine the right subpixel intended to display the right eye image on the basis of the right eye visible region 51aR. The method by which the controller 7 determines the right subpixel on the basis of the right eye visible region 51aR is identical with the method by which the controller 7 determines the left subpixel on the basis of the left eye visible region 51aL.

The controller 7 is configured to, on determination of the left subpixel and the right subpixel, determine the third subpixel which is the left subpixel and also is the right subpixel.

Second Example

Figure 12:
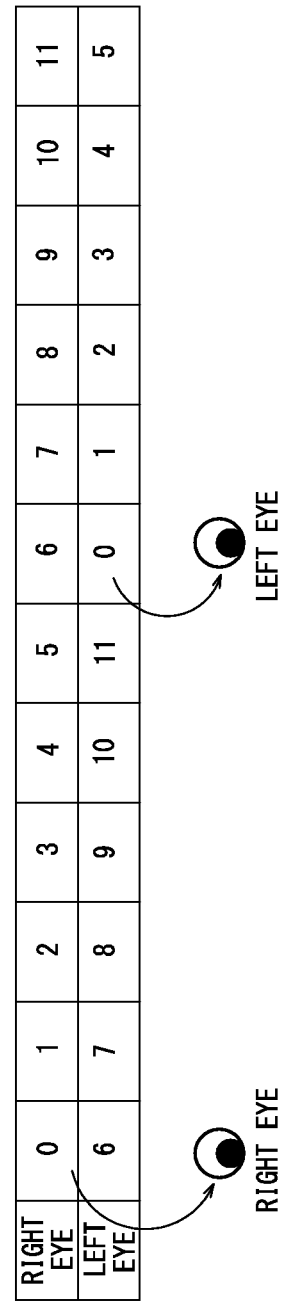
FIG. 12 is an explanatory view for illustrating information for identification of the position of the left eye and the position of the right eye.

The controller 7 may be configured to determine the third subpixel with use of the first table prestored in the memory 8. In the description of this example, as shown in FIG. 12, the position of the right eye and the position of the left eye in the horizontal direction are each identified by information 0 to 11. The information for identification of the position of the right eye under conditions where the inter-eye distance is the standard distance is assigned in the same manner as that for identification of the position of the left eye.

As shown in FIG. 13, the first table is configured to store data on the correspondence between the position of the left eye, as well as the position of the right eye, under conditions where the inter-eye distance E is the standard distance E0, and each of the left subpixel intended to display the left eye image on the basis of the position of the left eye and the right subpixel intended to display the right eye image on the basis of the position of the right eye. In the example shown in FIG. 13, pieces of information 0 to 11 for identification of eye position are indicated in columns, and pieces of information P1 to P12 for identification of subpixels are indicated in rows. The first table shows whether a given subpixel corresponding to each of different eye positions is the left subpixel or the right subpixel. The character "LEFT" and the character "RIGHT" in FIG. 13 indicate the left subpixel and the right subpixel, respectively. As described with reference to FIG. 12, with the inter-eye distance conforming with the standard distance, when the left eye lies at a position "0", the right eye lies at a position "0". For this case, FIG. 13 indicates that the subpixels P1 to P6 are the left subpixels, and the subpixels P7 to P12 are the right subpixels. Moreover, when the left eye lies at a position "1", the right eye lies at a position "1". For this case, FIG. 13 indicates that the subpixels P2 to P7 are the left subpixels, and the subpixels P8 to P12 are the right subpixels.

On the other hand, in the case where the inter-eye distance E is not the standard distance E0, when an image is displayed based on the position of the right eye according to the first table shown in FIG. 13, the right eye image is displayed via the subpixel intended to display the left eye image for the left eye. More specifically, the controller 7 is configured to, when the left eye lies at a position "11" and the right eye lies at a position "0", drive the subpixels P1 to P6 to display the left eye image and drive the subpixels P7 to P12 to display the right eye image based on the position "0" of the right eye. In this case, as shown in the first table, with respect to the position "11" of the left eye, the subpixels P1 to P5 and P12 are to be intended to display the left eye image. Thus, when an image is displayed via each subpixel based on the position of the right eye, the right eye image displayed via the subpixel P12 is visually recognized. This increases the area of the right eye image which is visually recognized by the left eye, which results in increased crosstalk.

In this regard, the controller 7 is configured to determine the third subpixel which is the right subpixel intended to display the right eye image on the basis of the position of the right eye and also is the left subpixel intended to display the left eye image on the basis of the position of the left eye.

For example, the controller 7 is configured to, when the detection device 1 detects that the right eye lies at a position "0", determines that the subpixels P7 to P12 are the right subpixels based on the position "0" of the right eye by using the first table. At this time, when the detection device 1 detects that the left eye lies at a position "11", the controller 7 determines that the subpixels P1 to P5 and P12 are the left subpixels based on the position of the left eye by using the first table. Thus, the controller 7 is configured to determine that the third subpixel is the subpixel P12.

Third Example

The controller 7 may be configured to determine the third subpixel with use of the second table, prestored in the memory 8, for indicating the correspondence between the third subpixel and the position of the right eye, as well as the position of the left eye.

As described above, in this construction, the left eye visible region 51aL and the right eye visible region 51aR may be determined on the basis of the positions of the left eye and the right eye. Moreover, the left subpixel and the right subpixel may be determined on the basis of the left eye visible region 51aL and the right eye visible region 51aR, respectively. Furthermore, the third subpixel may be determined on the basis of the left subpixel and the right subpixel. Thus, as shown in FIG. 14, in the second table, the third subpixel may be configured to be stored in correspondence with the positions of the left eye and the right eye.

The controller 7 is configured to determine that the subpixel stored in correspondence with the positions of the left eye and the right eye in the second table is the third subpixel. In the example shown in FIG. 14, pieces of information 0 to 11 for identification of the position of the left eye are indicated in rows, and pieces of information 0 to 11 for identification of the position of the right eye are indicated in columns. Moreover, information on the subpixel defined as the third subpixel is stored in correspondence with the information for identification of the position of the left eye and the information for identification of the position of the right eye.

For example, let it be assumed that the detection device 1 detects that the left eye lies at a position "11" and the right eye lies at a position "0". In this case, the controller 7 is configured to determine that the subpixel P6 corresponding to the position "11" of the left eye and the position "0" of the right eye is the third subpixel according to the second table.

<Determination of Fourth Subpixel>

The controller 7 is configured to determine a fourth subpixel on the basis of the positions of the eyes of the user dr. The fourth subpixel is a subpixel which is neither the left subpixel nor the right subpixel. For example, the controller 7 may be configured to determine the left subpixel and the right subpixel individually as in the described first and second examples. The controller 7 may be configured to determine that a subpixel which is neither the left subpixel nor the right subpixel is the fourth subpixel.

As described above, in this construction, the left eye visible region 51aL and the right eye visible region 51aR may be determined on the basis of the positions of the left eye and the right eye. The left subpixel and the right subpixel may be determined on the basis of the left eye visible region 51aL and the right eye visible region 51aR, respectively. Moreover, the fourth subpixel may be configured to be determined on the basis of the left subpixel and the right subpixel. Thus, the memory 8 may be configured to store the third table indicating the fourth subpixel set in correspondence with the positions of the right eye and the left eye. In the construction in which the third table is stored in the memory 8, the controller 7 may be configured to determine that the subpixel stored in correspondence with the positions of the left eye and the right eye in the third table is the fourth subpixel.

<Display of Image>

Subsequently, the controller 7 is configured to drive the subpixel which is not the right subpixel but the left subpixel to display the left eye image. The controller 7 is configured to drive the subpixel which is not the left subpixel but the right subpixel to display the right eye image. The controller 7 is configured to drive the third subpixel to display the third image.

The controller 7 may be configured to drive the third subpixel to display, for example, a black image as the third image. For example, the black image refers to a blackish image having a predetermined brightness. The predetermined brightness may be set at a value corresponding to the luminance at the lowest gradation level or a gradation level comparable to the lowest gradation level among all the gradation levels that can be represented by subpixels. The controller 7 may be configured to drive the third subpixel to display the black image.

The controller 7 may be configured to drive the third subpixel to display one of the left eye image and the right eye image as the third image according to, for example, the characteristics of the user dr. Examples of the characteristics of the user dr include his or her dominant eye. More specifically, the controller 7 may be configured to effect display of that one of the left eye image and the right eye image which corresponds to the dominant eye in reference to preset or externally inputted information on the dominant eye of the user dr. The controller 7 may be configured to effect display of the left eye image as the third image when the dominant eye of the user dr is the left eye, and effect display of the right eye image as the third image when the dominant eye of the user dr is the right eye.

The controller 7 may be configured to drive the third subpixel to display, as the third image, an image having a brightness value equivalent to the average of the brightness values of the left eye image and the right eye image.

Figure 15:
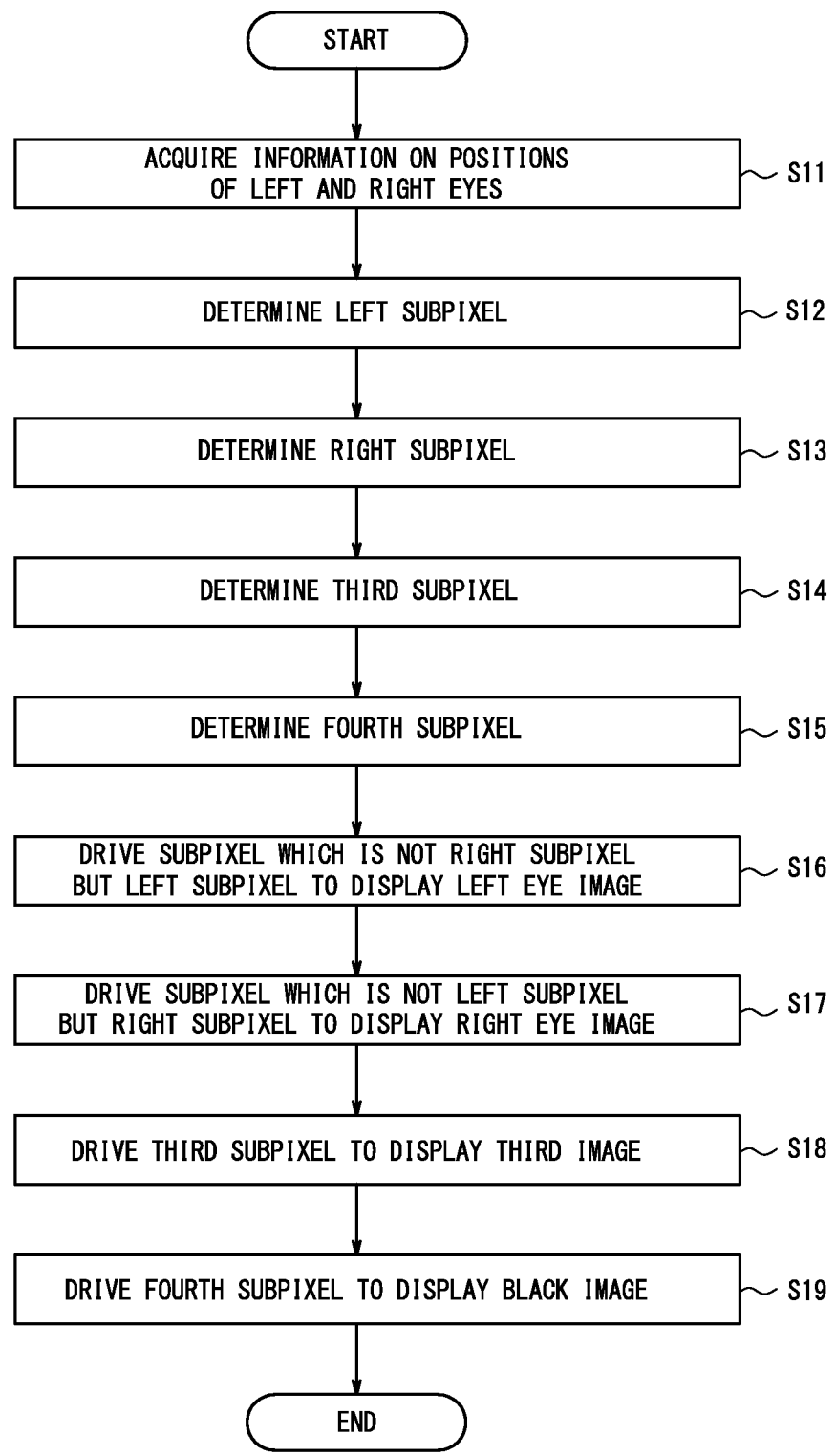
FIG. 15 is a flow chart showing an example of the flow of processing executed by a three-dimensional display device under conditions where the inter-eye distance differs from the standard distance.

The following describes an example of processing procedure which is to be performed by the three-dimensional display device 2 when the inter-eye distance E is not the standard distance E0 with reference to FIG. 15.

The controller 7 acquires information on the positions of the left eye and the right eye of the user dr from the detection device 1 (Step S11).

When information on the position of the left eye is acquired in Step S11, the controller 7 determines the left eye visible region 51aL on the basis of the position of the left eye, and then determines the left subpixel on the basis of the left eye visible region 51aL (Step S12).

When the left eye visible region 51aL is determined in Step S12, the controller 7 determines the right eye visible region 51aR on the basis of the position of the right eye in the information acquired in Step S11, and then determines the right subpixel on the basis of the right eye visible region 51aR (Step S13).

When the left subpixel is determined in Step S12 and the right subpixel is determined in Step S13, the controller 7 determines the third subpixel on the basis of the left subpixel and the right subpixel (Step S14). The controller 7 may determine the third subpixel by using information on the positions of the right eye and the left eye acquired in Step S11.

When the third subpixel is determined in Step S14, the controller 7 determines the fourth subpixel on the basis of the left subpixel and the right subpixel (Step S15). The controller 7 may determine the fourth subpixel on the basis of information on the positions of the right eye and the left eye acquired in Step S11.

When the fourth subpixel is determined in Step S15, the controller 7 drives the subpixel which is not the right subpixel but the left subpixel to display the left eye image (Step S16).

When the left eye image is displayed in Step S16, the controller 7 drives the subpixel which is not the left subpixel but the right subpixel to display the right eye image (Step S17).

When the right eye image is displayed in Step S17, the controller 7 drives the third subpixel to display the third image (Step S18).

When the third image is displayed via the third subpixel in Step S18, the controller 7 drives the fourth subpixel to display the black image (Step S19).

<<In the Case where User's Face Inclined to the Roll Direction>>

Figure 16:
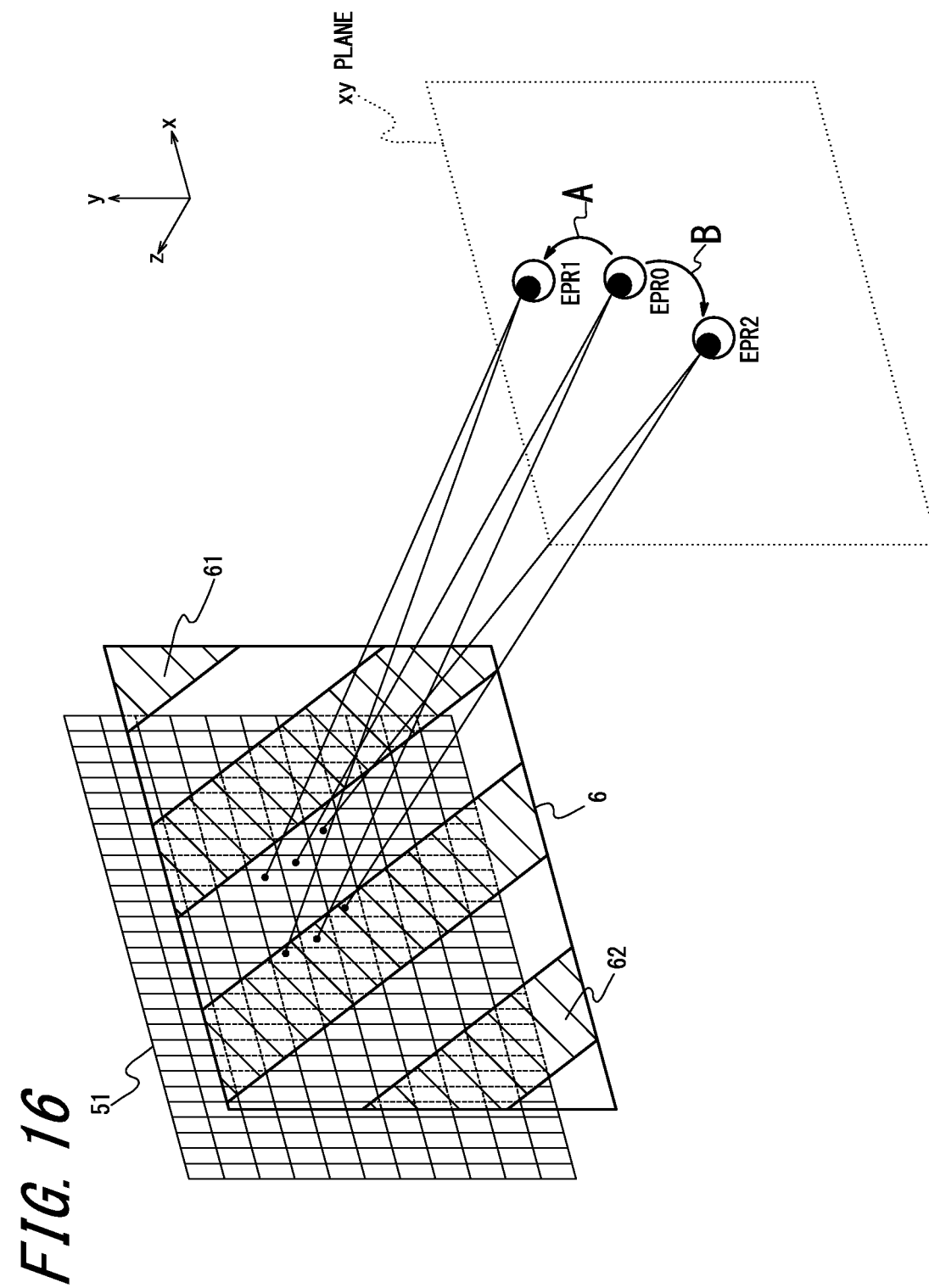
FIG. 16 is an explanatory view for illustrating display panel regions of the three-dimensional display system shown in FIG. 1 that are visible to user's eyes when an eye arrangement direction is inclined to a roll direction.

As described above, the display panel 5 and the optical element 6 are configured to allow the user dr to visually recognize a three-dimensional image properly under conditions where the right eye and the left eye of the user dr are spaced by the optimal viewing distance d away from the optical element 6. Thus, when the face of the user dr inclined to the roll direction, as shown in FIG. 16, the right eye of the user dr is displaced in the horizontal and vertical directions. Likewise, the left eye of the user dr is displaced in the horizontal and vertical directions from a standard position to a displaced position.

The inclination of the face to the roll direction means that the face is inclined within the range of a plane whose normal direction is the depth-wise direction (xy plane) without undergoing positional displacement in the depth-wise direction (z-axis direction). When in their standard position, the right eye and the left eye of the user dr are each spaced by the optimal viewing distance d away from the optical element 6, and are aligned in the horizontal direction. In the following description, the standard position of the left eye will be called "left eye standard position EPL0", and the standard position of the right eye will be called "right eye standard position EPR0". A position that the left eye assumes after undergoing displacement due to the rotation of the face in a predetermined direction about the center of the line connecting the two eyes (the center of an inter-eye line) will be called "left eye displaced position EPL1", and a position that the right eye assumes in the same state will be called "right eye displaced position EPR1". A position that the left eye assumes after undergoing displacement due to the rotation of the face in a direction opposite to the predetermined direction about the center of the inter-eye line will be called "left eye displaced position EPL2", and a position that the right eye assumes in the same state will be called "right eye displaced position EPR2".

As described above, when the position of the left eye is displaced in the horizontal direction, the left eye visible region 51aL varies. When the position of the right eye is displaced in the horizontal direction, the right eye visible region 51aR varies. The light transmitting region 62 of the optical element 6 extends in a direction forming a predetermined non-zero angle with the vertical direction. In this way, the position of each end of the light transmitting region 62 in the horizontal direction varies depending on the vertical position. Thus, as shown in FIG. 16, the right eye visible region 51aR varies even depending on vertical displacement of the right eye. Likewise, the left eye visible region 51aL varies even depending on vertical displacement of the left eye. Hence, the right eye visible region 51aR is configured to be determined on the basis of the position of the right eye in the horizontal and vertical directions. Likewise, the left eye visible region 51aL is configured to be determined on the basis of the position of the left eye in the horizontal and vertical directions. The segment regions in the active area 51 shown in FIG. 16 are in a one-to-one correspondence with the subpixels thus far described with reference to FIG. 2.

The following details subpixels that act to vary displayed images in response to the inclination of the face of the user dr to the roll direction.

Figure 17:
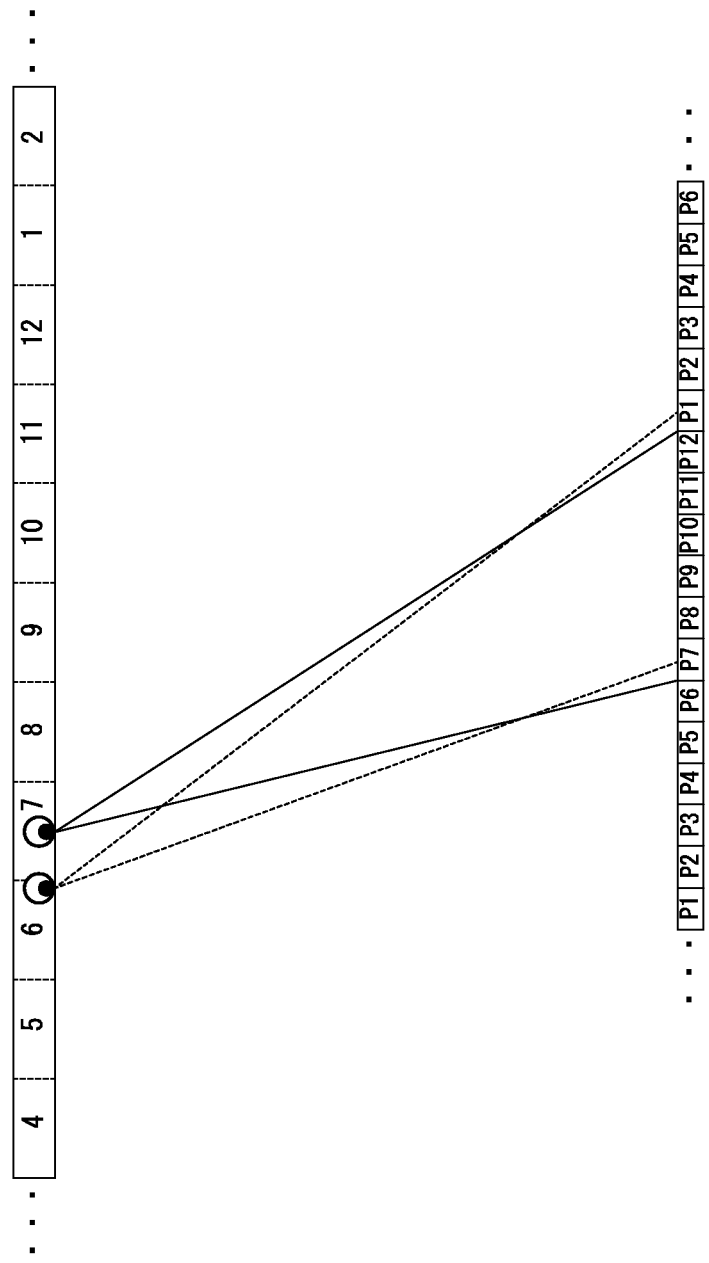
FIG. 17 is an explanatory view for illustrating a visible region as observed when the eye is displaced so as to move beyond a control boundary.

As shown in FIG. 17, the controller 7 is configured to, when the position of the left eye moves beyond a control boundary, drive at least some of the subpixels to vary the displayed image. The control boundary refers to the boundary of control regions arranged adjacent each other in the horizontal direction. The control region refers to a region corresponding to a group of a plurality of mutually adjacent subpixels to be visually recognized by one of user's eyes through one light transmitting region 62 of the optical element 6.

For example, when the position of the left eye corresponds to a control region "7", the left eye visually recognizes the subpixels P7 to P12. The controller 7 is configured to drive the subpixels P7 to P12 to display the left eye image at this time. During the time when the position of the left eye is being maintained at the control region "7", the subpixels P7 to P12 remain as the subpixels driven to display the left eye image by the controller 7. When the position of the left eye is displaced from the control region "7" so as to move beyond the control boundary between the control region "7" and a control region "6", then less than one-half of the subpixel P7, the whole of the subpixels P8 to P12, and one-half or more of the subpixel P1 become subpixels which are visually recognized by the left eye. The controller 7 is configured to drive the subpixels P8 to P12 and P1 to display the left eye image at this time. Likewise, the controller 7 is configured to, when the position of the right eye moves beyond a control boundary, drive at least some of the subpixels to vary the displayed image.

Figure 18:
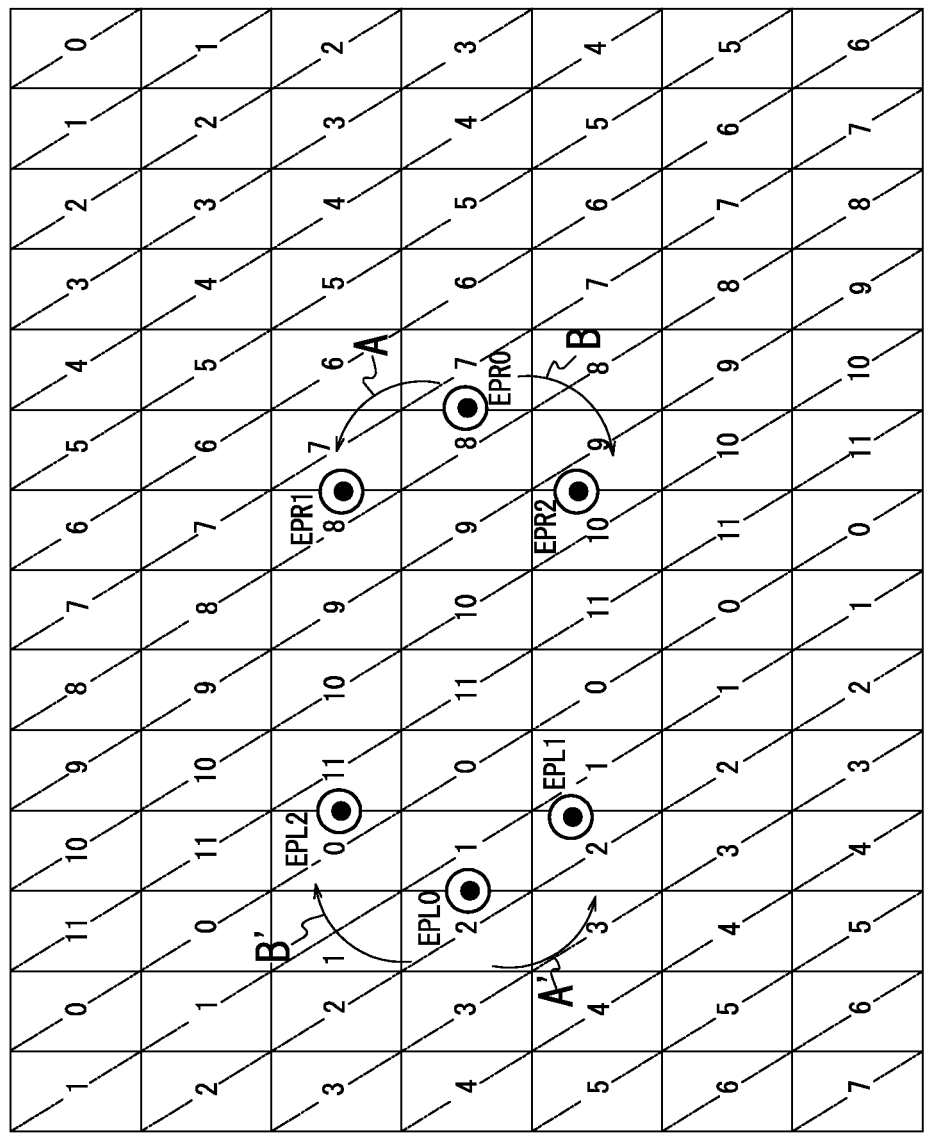
FIG. 18 is a view showing the control boundary shown in FIG. 14, as viewed in the depth-wise direction.

As described above, in this embodiment, the dimming face 61 and the light transmitting region 62 of the optical element 6 extend in a direction forming a predetermined non-zero angle with respect to the vertical direction. Thus, as shown in FIG. 18, each control boundary extends in parallel with the boundary of the dimming face 61 and the light transmitting region 62. On average, the distance traveled by the right eye rotating at a certain angle in a direction shown by the arrow A without crossing the control boundary indicated by alternate long and short dashed lines is longer than the distance traveled by the right eye rotating at the same angle in a direction shown by the arrow B opposite to the direction of the arrow A without crossing the control boundary. The rotation of the eye in the direction of the arrow A is a rotation such that a straight line passing through the right eye standard position EPR0 and the right eye displaced position EPR1 approaches in parallel with the control boundary. The rotation of the eye in the direction of the arrow B is a rotation such that a straight line passing through the right eye standard position EPR0 and the right eye displaced position EPR2 approaches perpendicular to the control boundary. When the control boundary is inclined diagonally downward to the right, the rotation approaching perpendicular to the control boundary is a clockwise rotation. When the control boundary is inclined diagonally downward to the right, the rotation approaching in parallel with in approximately parallel relation to the control boundary is a counterclockwise rotation. For the control boundary inclined diagonally downward to the left the reverse is true.

When the right eye rotates in the direction of the arrow A, the left eye rotates in a direction shown by the arrow A'. On average, the distance traveled by the left eye rotating at a certain angle in the direction of the arrow A' without crossing the control boundary indicated by alternate long and short dashed lines is longer than the distance traveled by the left eye rotating at the same angle in a direction shown by the arrow B' opposite to the direction of the arrow A' without crossing the control boundary. The rotation of the eye in the direction of the arrow A' it a rotation such that a straight line passing through the left eye standard position EPL0 and the left eye displaced position EPL1 approaches parallelism with the control boundary. The rotation of the eye in the direction of the arrow B' is a rotation such that a straight line passing through the left eye standard position ELR0 and the left eye displaced position EPL2 approaches perpendicularity to the control boundary.

Thus, when the right eye and the left eye rotate in the directions of the arrow A and the arrow A', respectively, on average, the number of subpixels that are driven to vary the displayed image by the controller 7 is smaller than the number of subpixels that are similarly driven when the right eye and the left eye rotate at the same angle in the opposite directions.

Thus, the left eye visible region 51aL and the right eye visible region 51aR as observed when the eye arrangement direction is displaced from the horizontal direction within the range of a x-z plane vary with respect to the left eye visible region 51aL and the right eye visible region 51aR as observed when the eye arrangement direction coincides with the horizontal direction. This causes the left eye visible region 51aL and the right eye visible region 51aR to be overlapped, which may result in the presence of the binocularly visible region 51aLR. The subpixel determined to be the left subpixel on the basis of the left eye visible region 51aL and the subpixel determined to be the right subpixel on the basis of the right eye visible region 51aR may be overlapped. This may lead to increased crosstalk. In this regard, the controller 7 is configured to control an image displayed by the three-dimensional display device 2 designed according to the eye arrangement direction coinciding with the horizontal direction in a manner permitting reduction in crosstalk that occurs when the eye arrangement direction is displaced from the horizontal direction due to the inclination of the face to the roll direction. The following details the controller 7.

<Determination of Third Subpixel>

The controller 7 is configured to determine the third subpixel on the basis of the positions of the left eye and the right eye.

First Example

As in the above-described case, the controller 7 may be configured to determine the left eye visible region 51aL through computation on the position of the left eye in the horizontal and vertical directions, the gap g, the optimal viewing distance d, the position of the light transmitting region 62, and the inclination of each end of the light transmitting region 62 in the horizontal direction. As in the above-described case, the controller 7 may be configured to determine the right eye visible region 51aR through computation on the position of right eye of the user dr detected by the detection device 1, the position of the barrier opening area, the gap g, and the optimal viewing distance d. Moreover, as in the described case, the controller 7 may be configured to determine the left subpixel and the right subpixel on the basis of the left eye visible region 51aL and the right eye visible region 51aR, respectively.

Second Example

The controller 7 may be configured to determine the left subpixel on the basis of the position of the left eye in the horizontal and vertical directions, and determine the right subpixel in accordance with the position of the right eye in the horizontal and vertical directions by using the fourth table stored in the memory 8. The fourth table is made to store the correspondence between the position of the left eye and the position of the right eye, in the horizontal and vertical directions under conditions where the inter-eye distance is the standard distance, and each of the left subpixel and the right subpixel that are intended to display the left eye image and the right eye image, respectively, on the basis of the eye position.

More specifically, the controller 7 may be configured to determine that a subpixel, which is shown in the fourth table as the subpixel intended to display the left eye image on the basis of the position of the left eye in the horizontal and vertical directions, is the left subpixel, when the detection device 1 detects the position of the left eye in the horizontal and vertical directions. Likewise, the controller 7 may be configured to determine that a subpixel, which is shown in the fourth table as the subpixel intended to display the right eye image on the basis of the position of the right eye in the horizontal and vertical directions, is the right subpixel, when the detection device 1 detects the position of the right eye. Subsequently, the controller 7 may be configured to determine that a subpixel which is the left subpixel and also is the right subpixel is the third subpixel.

Third Example

The controller 7 may be configured to determine the third subpixel on the basis of the position of the left eye and the position of the right eye in the horizontal and vertical directions by using the fifth table. The fifth table is a table which indicates the correspondence between the third subpixel, and the position of the left eye in the horizontal and vertical directions and the position of the right eye in the horizontal and vertical directions.

<Determination of Fourth Subpixel>

The controller 7 may be configured to determine that a subpixel which is neither the left subpixel nor the right subpixel is the fourth subpixel. The controller 7 may be configured to determine the fourth subpixel on the basis of the positions of the left eye and the right eye by using the sixth table. The sixth table is a table which indicates the correspondence between the fourth subpixel, and the position of the left eye in the horizontal and vertical directions and the position of the right eye in the horizontal and vertical directions.

<Display of Image>

The controller 7 is configured to drive the left subpixel, the right subpixel, the third subpixel, and the fourth subpixel to display the left eye image, the right eye image, the third image, and the black image, respectively.

An example of processing procedure which is to be performed by the three-dimensional display device 2 when the face of the user dr is inclined to the roll direction is similar to the processing procedure shown in FIG. 15 that is to be performed by the three-dimensional display device 2 when the inter-eye distance is not the standard distance. When the face of the user dr is inclined to the roll direction, in Step S12 shown in FIG. 15, the controller 7 is configure to determine the left eye visible region 51aL on the basis of the position of the left eye in the horizontal and vertical directions, and then to determine the left subpixel. In Step S13, the controller 7 is configured to determine the right eye visible region 51aR on the basis of the position of the right eye in the horizontal and vertical directions, and then to determine the right subpixel. Otherwise, the processing procedure is similar to the processing procedure which is to be performed by the three-dimensional display device 2 when the inter-eye distance E is not the standard distance E0.

<<In the Case where User's Face is Inclined to the Pan Direction>>

Figure 19:
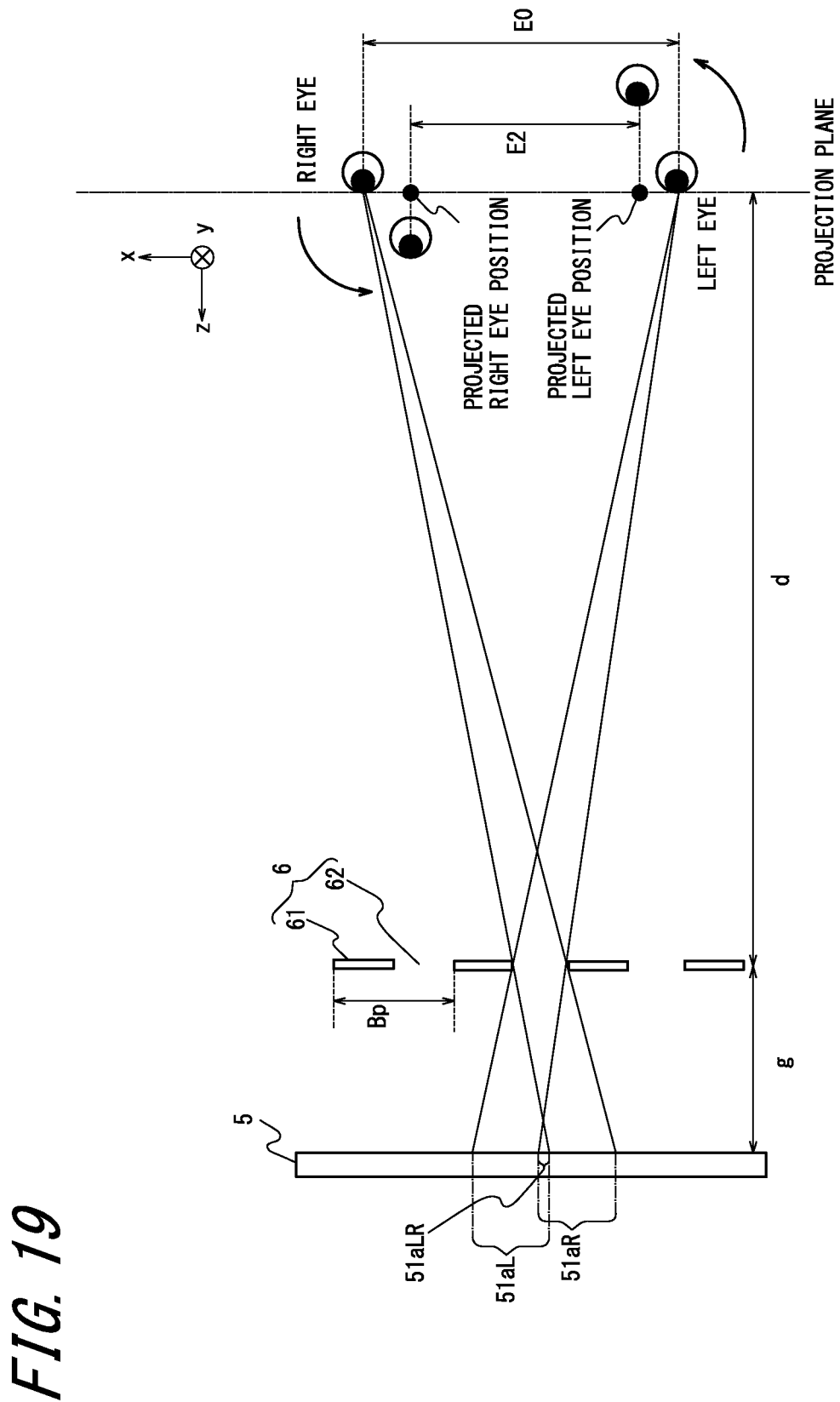
FIG. 19 is an explanatory view for illustrating display panel regions of the three-dimensional display system shown in FIG. 1 that are visually recognized by user's eyes when the eye arrangement direction is inclined to a pan direction.

As described above, the three-dimensional display device 21 is configured to allow the user dr to visually recognize a three-dimensional image properly on the basis of the inter-eye distance under conditions where user's right and left eyes are spaced by the optimal viewing distance d away from the optical element 6. For example, as shown in FIG. 19, when the face of the user dr is inclined to the pan direction, the horizontal component of the distance between the right and left eyes of the user dr corresponds to a value of "E2" which differs from the inter-eye distance E. The inclination of the face to the pan direction means that the face is inclined within the range of a plane whose normal direction is the vertical direction (xz plane) without undergoing positional displacement in the vertical direction (y direction). Accordingly, there may be a case where the three-dimensional display device 2 designed according to the inter-eye distance E fails to allow the user dr to visually recognize a three-dimensional image properly.

<Determination of Projected Left Eye Position and Projected Right Eye Position>

The controller 7 is configured to determine a projected left eye position (projected first position) which is the position of the left eye detected by the detection device 1 that is projected on a plane which is parallel to the active area 51 and is spaced by the optimal viewing distance d away from the optical element 6. Moreover, the controller 7 is configured to determine a projected right eye position (projected second position) which is the position of the right eye detected by the detection device 1 that is projected on a plane which is parallel to the active area 51 and is spaced by the optimal viewing distance d away from the optical element 6.

<Determination of Third Subpixel>

As in the case where the inter-eye distance is not the standard distance, the controller 7 is configured to determine the left subpixel, the right subpixel, and the third subpixel on the basis of the projected left eye position and the projected right eye position defined as the position of the left eye and the position of the right eye, respectively.

<Determination of Fourth Subpixel>

As in the case where the inter-eye distance E is not the standard distance E0, the controller 7 may be configured to determine the fourth subpixel on the basis of the subpixels determined to be the left subpixel and the right subpixel, respectively, on the basis of the projected left eye position and the projected right eye position defined as the position of the left eye and the position of the right eye, respectively. Moreover, as in the case where the inter-eye distance is not the standard distance, the controller 7 may be configured to determine the fourth subpixel on the basis of the projected left eye position defined as the position of the left eye and the projected right eye position defined as the position of the right eye by using the third table.

<Display of Image>

The controller 7 is configured to drive the left subpixel, the right subpixel, the third subpixel, and the fourth subpixel to display the left eye image, the right eye image, the third image, and the black image, respectively.

Figure 20:
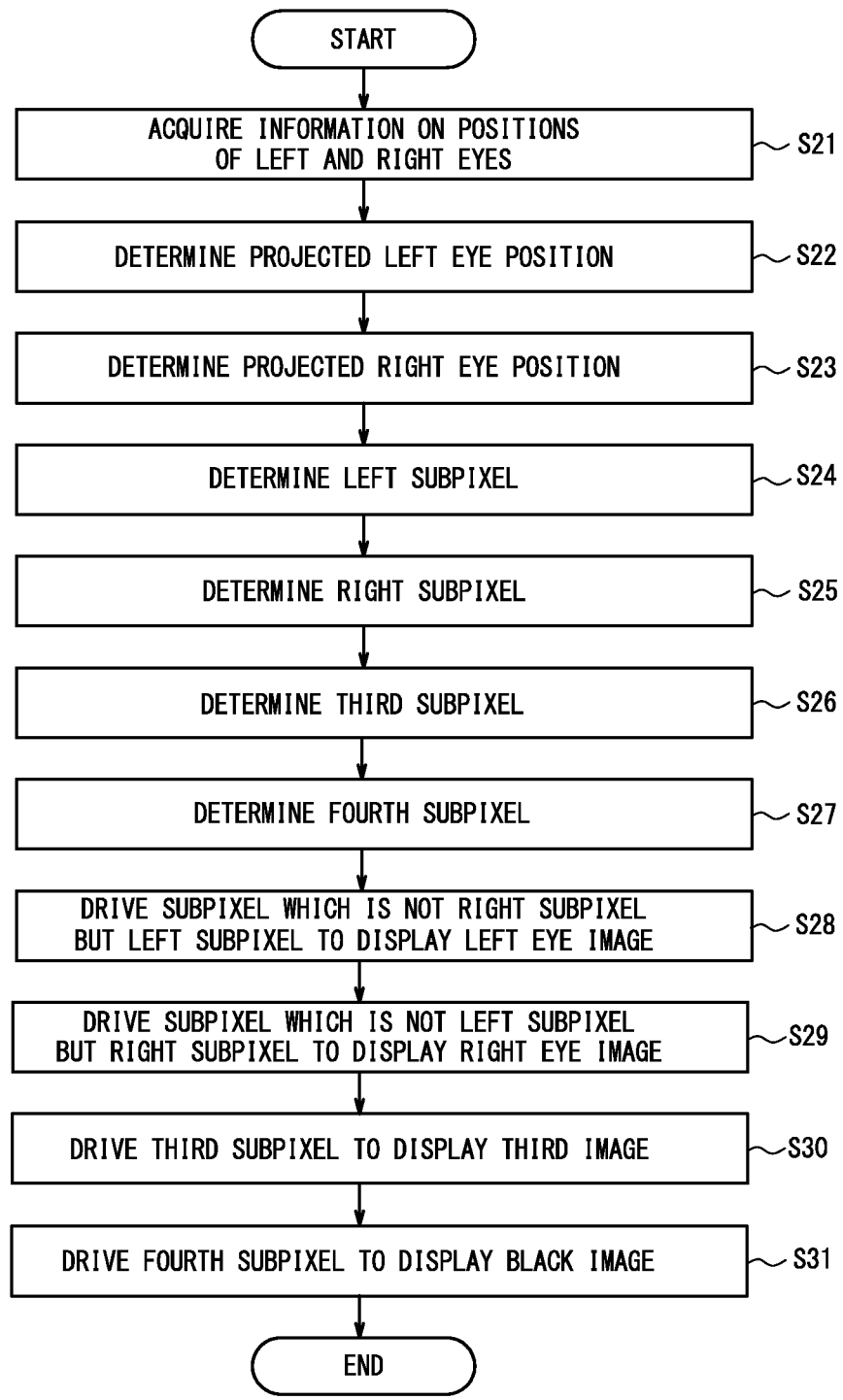
FIG. 20 is a flow chart showing an example of the flow of processing executed in the three-dimensional display device under conditions where user's face is inclined to the pan direction.

The following describes an example of processing procedure which is to be performed by the three-dimensional display device 21 when the face of the user dr is inclined to the pan direction with reference to FIG. 20.

The controller 7 acquires information indicating the positions of the left and right eyes of the user dr from the detection device 1 (Step S21).

When the information is acquired in Step S21, the controller 7 determines the projected left eye position, i.e, the position of the left eye of the user dr that is projected on a plane which is spaced by the optimal viewing distance d away from the optical element 6 and is parallel to the active area 51 (Step S22).

When the projected left eye position is determined in Step S22, the controller 7 determines the projected right eye position, i.e., the position of the right eye indicated by the information acquired in Step S21 that is projected on a plane which is spaced by the optimal viewing distance d away from the optical element 6 and is parallel to the active area 51 (Step S23).

When the projected right eye position is determined in Step S23, the controller 7 determines the left eye visible region 51aL on the basis of the projected left eye position determined in Step S22, and then determines the left subpixel on the basis of the left eye visible region 51aL (Step S24).

When the left subpixel is determined in Step S24, the controller 7 determines the right eye visible region 51aR on the basis of the projected right eye position determined in Step S23, and then determines the right subpixel on the basis of the right eye visible region 51aR (Step S25).

When the right subpixel is determined in Step S25, the controller 7 executes the process from Steps S26 to S31. The process from Step S26 to Step S31 is identical with the process from Step S14 to Step S19 set for the case where the inter-eye distance E is not the standard distance E0.

As described heretofore, in this embodiment, the optical means of the optical element 6 extends in the inclination direction inclined to the reference direction with respect to a direction perpendicular to the parallax direction, and, the reference direction is defined, at least in a standard state, on the basis of at least one of the position of the user dr in the parallax direction in the interior of the moving body 10 and the position relative to the user dr of a predetermined facility mounted within the moving body 10. In the embodiment thereby designed, by virtue of the reference direction in at least the standard state, the optical element 6 may be inclined to the direction in which the face of the user dr rolls most frequently. Thus, in this embodiment, the rotation direction where, on average, the subpixels intended to vary the parallax image are few (refer to FIG. 18) may be brought into coincidence with the direction in which the face of the user dr rolls most frequently. Hence, the embodiment may reduce the frequency of occurrence of variation of the parallax image that may involve time lag, and may thus reduce the frequency of perception of crosstalk by the user dr.

Moreover, in this embodiment, in the optical element 6, the inclination direction of the optical means can be changed. According to such a configuration, in the embodiment, when the three-dimensional display system 100 is installed in the moving body 10, the inclination direction can be changed on the basis of the reference direction defined according to the moving body 10. Hence, the embodiment eliminates the need to prepare the optical element 6 for each and every reference direction, and thus allows the three-dimensional display system 100 to be obtained in a simple manufacturing process at low manufacturing cost.

Moreover, in this embodiment, the controller 7 is configured to change the inclination direction of the optical means according to the reference direction. According to such a configuration, in the embodiment, when the three-dimensional display system 100 is installed in the moving body 10, the inclination direction can be readily changed without the necessity of using an external device designed specifically for the setting of the inclination direction.

Moreover, in this embodiment, the controller 7 is configured to reverse the reference direction when the face of the user dr is inclined to a direction opposite to the reference direction in the standard state. According to such a configuration, in the embodiment, the inclination direction of the optical means can be changed in response to the change of the reference direction in actual use of the system. Accordingly, in this embodiment, when the face of the user dr is inclined to a direction opposite to the reference direction in the standard state, the inclination direction of the optical means is changed accordingly. This makes it possible to reduce the frequency of perception of crosstalk by the user dr even when the face is inclined to the opposite direction.

Moreover, in this embodiment, the controller 7 is configured to, under conditions where the reference direction in the standard state is reversed in response to the inclination of the face of the user dr to a direction opposite to the reference direction and subsequently the face is further inclined to the reversed reference direction, vary the parallax image on the basis of the positions of the first eye and the second eye. According to such a configuration, in the embodiment, it is possible to reduce the occurrence of crosstalk that cannot be reduced only by the change of the inclination direction.

Moreover, in this embodiment, the controller 7 is configured to determine the left eye visible region 51aL on the basis of the position of the left eye, and determine the right eye visible region 51aR on the basis of the position of the right eye. Thus, the left eye visible region 51aL is determined not on the basis of the position of the right eye and the standard distance E0, but on the basis of the position of the left eye. The right eye visible region 51aR is determined not on the basis of the position of the left eye and the standard distance E0, but on the basis of the position of the right eye. This enables accurate determination of the region visually recognized by the right eye and the region visually recognized by the left eye even when the inter-eye distance E differs from the standard distance E0.

The controller 7 is configured to determine the left subpixel and the right subpixel on the basis of the left eye visible region 51aL and the right eye visible region 51aR, respectively. The controller 7 is configured to drive the subpixel which is not the right subpixel but the left subpixel to display the left eye image, and drive the subpixel which is not the left subpixel but the right subpixel to display the right eye image. The controller 7 is configured to drive the third subpixel to display the third image. Accordingly, in the case where the inter-eye distance is not the standard distance, it is possible to control an image visually recognized by both eyes of the user dr so as to reduce crosstalk. This allows the user dr to visually recognize a three-dimensional image properly.

In this embodiment, the controller 7 is configured to permit determination of the left subpixel on the basis of the position of the left eye by using the first table indicating the correspondence between the position of the left eye and the position of the right eye spaced by the standard distance away from the left eye, and an image intended to be displayed via the subpixels. The controller 7 is configured to permit determination of the right subpixel on the basis of the position of the right eye by using the first table. This eliminates the need for the controller 7 to perform, at every acquisition of information indicating the position of each eye, computation for determination of the left eye visible region 51aL and the right eye visible region 51aR on the basis of the position of each eye and according to the configuration of the optical element 6 and the display panel 5. Consequently, the processing load on the controller 7 may be reduced.

In this embodiment, the controller 7 is configured to permit display of the left eye image or the right eye image, as the third image, on the binocularly visible region 51aLR according to the characteristics of the user dr. This allows, for example, the dominant eye of the user dr to visually recognize only a dominant eye-specific image, and may thus reduce user dr's discomfort during image visual recognition.

In this embodiment, the controller 7 is configured to permit display of an image having a brightness value equivalent to the average of the brightness values of the left eye image and the right eye image as the third image. This allows the left eye of the user dr to visually recognize an image which is close in brightness to the left eye image rather than the right eye image, and allows the right eye of the user dr to visually recognize an image which is close in brightness to the right eye image rather than the left eye image. In this case, in contrast to cases where the left eye visually recognizes the right eye image or the right eye visually recognizes the left eye image, the user dr may enjoy image visual recognition with less discomfort.

In this embodiment, the controller 7 is configured to permit display of a black image having a brightness value which is less than or equal to a predetermined value as the third image. This can avoid that the left eye and the right eye of the user dr visually recognize a right eye-specific image and a left eye-specific image, respectively. Consequently, crosstalk can be reduced.

In this embodiment, the three-dimensional display device 2 may be provided with the memory 8 configured to store the second table indicating the correspondence between the third subpixel and the position of the left eye and the position of the right eye. The controller 7 is configured to permit determination of the third subpixel on the basis of the position of the left eye and the position of the right eye with use of the second table. This eliminates the need for the controller 7 to perform, at every acquisition of information on the position of each eye, computation for determination of the left eye visible region 51aL and the right eye visible region 51aR on the basis of the position of each eye and according to the configuration of the optical element 6 and the display panel 5. Moreover, the controller 7 does not necessarily have to conduct processing operation to determine the left subpixel on the basis of the left eye visible region 51aL and determine the right subpixel on the basis of the right eye visible region 51aR. Consequently, the processing load on the controller 7 may be reduced.

In this embodiment, the controller 7 is configured to drive the fourth subpixel to display the black image. Thus, no image light is emitted from the fourth subpixel. This can protect the eyes of the user dr from arrival of stray light caused by secondary reflection of image light emitted from the fourth subpixel from the members constituting the optical element 6, etc. Thus, the left eye and the right eye of the user dr clearly visually recognizes the left eye image and the right eye image, respectively, without interference from stray light.

In this embodiment, the controller 7 is configured to determine the left subpixel on the basis of the position of the left eye in the horizontal and vertical directions. Moreover, the controller 7 is configured to determine the right subpixel on the basis of the position of the right eye in the horizontal and vertical directions. Thus, even when the eye arrangement direction is not the horizontal direction, the controller 7 can reduce crosstalk during display of a three-dimensional image using the optical element 6 and the display panel 5 designed according to the eye arrangement direction coinciding with the horizontal direction.

In this embodiment, the controller 7 is configured to determine the left subpixel on the basis of the projected left eye position. Moreover, the controller 7 is configured to determine the right subpixel on the basis of the projected right eye position. Thus, even when the horizontal component of the inter-eye distance E is not the standard distance E0, the controller 7 can reduce crosstalk during display of a three-dimensional image using the optical element 6 and the display panel 5 designed according to the standard distance E0.

Although there has been shown and described herein a certain embodiment as a representative example, it is apparent to those skilled in the art that many changes and rearrangement of parts are possible within the spirit and scope of the invention. That is, the described embodiment is not to be construed as limiting of the invention, and hence various changes and modifications may be made without departing from the scope of the appended claims. For example, a plurality of constituent blocks as shown in the embodiment or examples may be combined into one, or a single constituent block may be divided into pieces.

While, in the above-described embodiment, the controller 7 is configured to determine the left subpixel, and thereafter determine the right subpixel, this does not constitute any limitation. The controller 7 may be configured to determine the right subpixel, and thereafter determine the left subpixel.

While, in the above-described embodiment, the controller 7 is configured to curry out display of the left eye image, the right eye image, the third image, and the black image one after another in the order named, this does not constitute any limitation. The controller 7 may be configured to carry out display of the left eye image, the right eye image, the third image, and the black image in any order. The controller 7 may be configured to carry out concurrent display of two or more of the left eye image, the right eye image, the third image, and the black image.

While, in the above-described embodiment, the controller 7 is configured to determine the fourth subpixel on the basis of the left eye visible region 51aL and the right eye visible region 51aR and then drive the fourth subpixel to display the black image, this does not constitute any limitation. For example, the controller 7 may be configured to drive the left subpixel, the right subpixel, and the third subpixel to display the left eye image, the right eye image, and the third image, respectively, and drive a subpixel which is not involved in display of any of the aforenamed images to display the black image.

Figure 21:
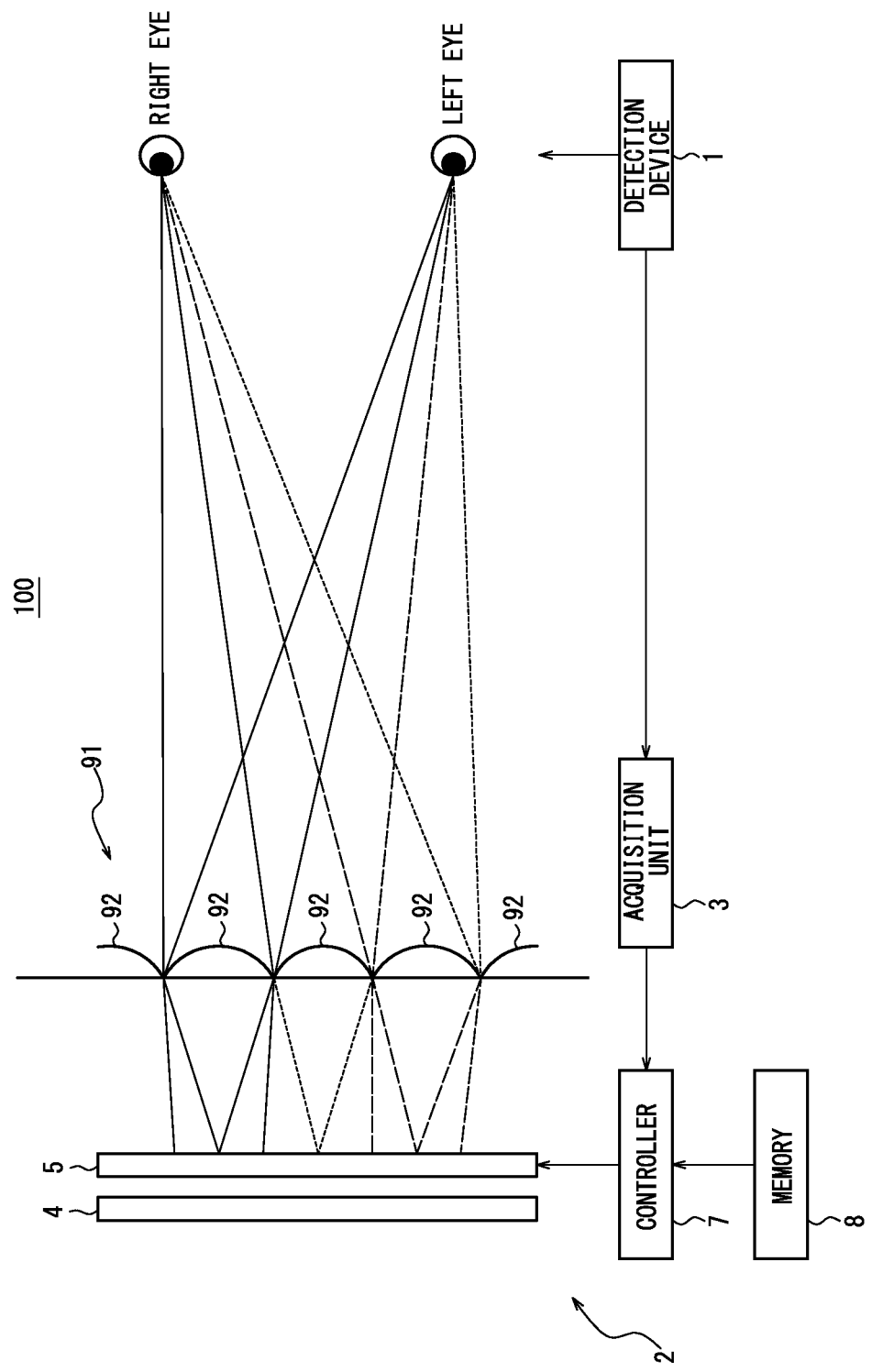
FIG. 21 is a schematic diagram of the three-dimensional display device using a lenticular lens as the optical element.

While, in the above-described embodiment, the optical element 6 is a parallax barrier, this does not constitute any limitation. For example, as shown in FIG. 21, a lenticular lens 91 may be used as the optical element 6 provided in the three-dimensional display device 2. The lenticular lens 91 is constructed of a horizontal arrangement of a plurality of vertically extending cylindrical lenses 92. Like the parallax barrier, the lenticular lens 91 is made to enable image light emitted from the subpixel in the left eye visible region 51aL to reach the position of the left eye of the user dr. Moreover, the lenticular lens 91 is made to enable image light emitted from the subpixel in the right eye visible region 51aR to reach the position of the right eye of the user dr.

It should be noted that the system disclosed herein is of the type which incorporates various modules and/or units for performing predetermined functions, and, such modules, as well as units, are schematically shown for the sake of brevity in explanations of their functionality and thus do not necessarily denote specific hardware and/or software. In that sense the modules and/or units and other constituent components need only be hardware and/or software incorporated so as to substantially execute the predetermined functions described in this specification. Various functions of different constituent components may be implemented by combined or independent use of hardware and/or software without restraint. Moreover, input/output, or I/O devices or user interfaces, including but not limited to keyboards, displays, touch screens, and pointing devices, may be connected directly or via an intermediate I/O controller to the system. Thus, various aspects of the disclosure may be carried into effect in many different forms, and all such forms fall within the scope of the disclosure.

Moreover, a machine-readable non-transitory storage medium may be built as a computer-readable tangible carrier (medium) of such a kind as a solid-state memory device, a magnetic disk, and an optical disk. This storage medium stores a suitable set of computer commands such as a program module for effecting control of a processor in a manner to execute the techniques disclosed herein, and data structures, etc. Examples of the computer-readable medium include electrical connection means with one or more wirings, magnetic disk media, magnetic cassettes, magnetic tapes, other types of magnetic and optical storage devices (such as CD (Compact Disk), Laser Disc (trademark), DVD (Digital Versatile Disc), Floppy disk, and Blu-ray Disc), portable computer disk, RAM (Random Access Memory), ROM (Read-Only Memory), EPROM, EEPROM, rewritable and programmable ROM such as flash memory, other types of tangible storage media for storage of information, and varying combinations of some of the aforenamed media. The memory may be disposed inside and/or outside the processor/processing unit. As employed herein the term "memory" refers to all kinds of memory means such as long-term memory, short-term memory, volatile memory, non-volatile memory, etc., and, no specific limitations are placed on the type of memory, the number of memory means, and the type of a medium for memory storage.

REFERENCE SIGNS LIST

1: Detection device
2: Three-dimensional display device
3: Acquisition unit
4: Irradiator
5: Display panel
6: Optical element
7: Controller
8: Memory
10: Moving body
11: Steering wheel
51: Active area
51aL: Left eye visible region
51aR: Right eye visible region
51bL: Left eye non-visible region
51bR: Right eye non-visible region
51aLR: Binocularly visible region
51bLR: Binocularly non-visible region
61: Dimming face
62: Light transmitting region
91: Lenticular lens
92: Cylindrical lens
100: Three-dimensional display system
400: Head-up display system
410: Optical member
420: Member for projection
430: Plane for projection
440: Optical path
450: Virtual image
dr: User

The invention claimed is:

1. A three-dimensional display system for allowing a user of a moving body to visually recognize a three-dimensional image, comprising:
a display panel comprising an active area configured to display a parallax image comprising a first image to be projected into a first eye of the user and a second image to be projected into a second eye of the user;
an optical element which defines a light beam direction of image light for the parallax image which is displayed on the active area; and
a controller configured to vary the parallax image based on a position of the first eye of the user and a position of the second eye of the user,
the optical element comprising a plurality of optical means which are arranged in a parallax direction, and define the light beam direction,
the plurality of optical means extending along an inclination direction inclined to a reference direction parallel to the parallax direction, with respect to a direction perpendicular to the parallax direction,
the reference direction being defined, at least in a standard state, based on at least one of a position of the user in the parallax direction in an interior of the moving body and a position relative to the user of a predetermined facility mounted within the moving body,
the controller is configured to, when a face of the user is inclined to a direction opposite to the reference direction in the standard state, change the reference direction, and
the controller is configured to control the optical element to change the inclination direction of the optical means in accordance with the change in the reference direction.

2. The three-dimensional display system according to claim 1,
wherein the reference direction in the standard state is opposite to a direction from a center of the interior of the moving body in the parallax direction to the position of the user.

3. The three-dimensional display system according to claim 1,
wherein the reference direction in the standard state is opposite to a direction from the center of the interior of the moving body in the parallax direction to a position of a steering wheel of the moving body.

4. A three-dimensional display system for allowing a user to visually recognize a three-dimensional image, comprising:
a display panel comprising an active area configured to display a parallax image including a first image to be projected into a first eye of the user and a second image to be projected into a second eye of the user;
an optical element which defines a light beam direction of image light for the parallax image which is displayed on the active area; and
a controller configured to vary the parallax image based on a position of the first eye of the user and a position of the second eye of the user,
the optical element comprising a plurality of optical means which are arranged in a parallax direction, and define the light beam direction, the plurality of optical means extending along an inclination direction inclined to a reference direction parallel to the parallax direction, with respect to a direction perpendicular to the parallax direction, the controller being configured to, when a face of the user is inclined to a direction opposite to the reference direction in a standard state, change the reference direction, and the controller being configured to control the optical element to change the inclination direction of the optical means in accordance with the change in the reference direction.

5. The three-dimensional display system according to claim 1, wherein the controller is configured to, under conditions where the reference direction in the standard state is changed in response to an inclination of the face of the user to a direction opposite to the reference direction and subsequently the face is further inclined to the reversely changed reference direction, vary the parallax image based on the position of the first eye and the position of the second eye.

6. An optical element which defines a light beam direction of image light for a parallax image, comprising:

a plurality of optical means which are arranged in a parallax direction, and define the light beam direction, the plurality of optical means extending along an inclination direction inclined to a first rotation direction with respect to a direction perpendicular to the parallax direction, the inclination direction being inclined to a reference direction parallel to the parallax direction, with respect to a direction perpendicular to the parallax direction, a direction in which a user's face rolls most frequently being predetermined as being the first rotation direction, the reference direction being changeable by a controller when the user's face is inclined to a direction opposite to the reference direction in a standard state, and the optical element is controlled by the controller to change the inclination direction of the optical means in accordance with a change in the reference direction.

7. An installation method for installing an optical element which defines a light beam direction of image light for a parallax image, the optical element comprising a plurality of optical means that extend along an inclination direction inclined to a first rotation direction with respect to a direction perpendicular to a parallax direction, are arranged in the parallax direction, and define the light beam direction, and the inclination direction being inclined to a reference direction parallel to the parallax direction, with respect to a direction perpendicular to the parallax direction, the installation method, comprising:

determining a direction in which user's face rolls most frequently based on user's position in the parallax direction in an interior of a moving body installed with the optical element;

determining the direction in which user's face rolls most frequently, as being the first rotation direction;

changing, by a controller, the reference direction when the user's face is inclined to a direction opposite to the reference direction in a standard state; and controlling, by the controller, the optical element to change the inclination direction of the optical means in accordance with a change in the reference direction.

8. A control method to control a three-dimensional display system for allowing a user of a moving body to visually recognize a three-dimensional image, the three-dimensional display system comprising a display panel comprising an active area configured to display a parallax image including a first image to be projected into a first eye of the user and a second image to be projected into a second eye of the user, an optical element which defines a light beam direction of image light for the parallax image which is displayed on the active area, and a controller configured to vary the parallax image, the optical element comprising a plurality of optical means which are arranged in a parallax direction, and define the light beam direction, the optical means extending along an inclination direction inclined to a reference direction parallel to the parallax direction, with respect to a direction perpendicular to the parallax direction, the reference direction being defined, at least in a standard state, based on at least one of a position of the user in the parallax direction in an interior of the moving body and a position relative to the user of a predetermined facility mounted within the moving body, the control method, comprising:

varying the parallax image based on a position of the first eye of the user and a position of the second eye of the user;

changing, by a controller, the reference direction when a face of the user is inclined to a direction opposite to the reference direction in a standard state; and controlling, by the controller, the optical element to change an inclination direction of the optical means in accordance with the change in the reference direction.

9. A moving body, comprising:

a three-dimensional display system for allowing a user of a moving body to visually recognize a three-dimensional image, comprising:

a display panel comprising an active area configured to display a parallax image comprising a first image to be projected into a first eye of the user and a second image to be projected into a second eye of the user, an optical element which defines a light beam direction of image light for the parallax image which is displayed on the active area, and a controller configured to vary the parallax image based on a position of the first eye of the user and a position of the second eye of the user, the optical element comprising a plurality of optical means which are arranged in a parallax direction, and define the light beam direction, the optical means extending along an inclination direction inclined to a reference direction parallel to the parallax direction, with respect to a direction perpendicular to the parallax direction, the reference direction being defined, at least in a standard state, based on at least one of a position of the user in the parallax direction in an interior of the moving body and a position relative to the user of a predetermined facility mounted within the moving body, the controller being configured to, when a face of the user is inclined to a direction opposite to the reference direction in the standard state, change the reference direction, and the controller being configured to control the optical element to change the inclination direction of the optical means in accordance with the change in the reference direction.

10. The three-dimensional display system according to claim 4,
wherein the controller is configured to, under conditions where the reference direction in the standard state is changed in response to an inclination of the face of the user to a direction opposite to the reference direction and subsequently the face is further inclined to the reversely changed reference direction, vary the parallax image based on the position of the first eye and the position of the second eye.

* * * * *